United States Statutory Invention Registration [19]

[11] Reg. Number: H289

Beltracchi [43] Published: Jun. 2, 1987

[54] INTEGRATED ICONIC DISPLAY

[76] Inventor: Leo Beltracchi, 12112 Triple Crown Rd., Gaithersburg, Md. 20878

[21] Appl. No.: 801,424

[22] Filed: Nov. 25, 1985

[51] Int. Cl.[4] ..... H02J 13/00; G01D 3/04; G21C 17/02

[52] U.S. Cl. ..... 364/492; 364/505; 376/245

*Primary Examiner*—Stephen C. Buczinski
*Assistant Examiner*—Linda J. Wallace

[57] ABSTRACT

An integrated display called an iconic display is disclosed, which contains an image of the thermodynamic heat transfer process for a pressurized water nuclear power plant from the heat source (the reactor) to the heat sink (the environment). Shown is a main curve comprising a saturated steam line and a saturated water line, superimposed upon which are symbols indicating such operating data as water level and temperatures, and the status of various pumps and valves. By analyzing the graphic presentation and the relationships between the various symbols, the status of the thermodynamic cycle of the plant can be determined and trends monitored. Real time data inputs can be used, or hypothetical situations can be constructed. Illustrated are two actual undesirable plant conditions from nuclear power mishaps which graphically demonstrate the operation and advance in the art set forth in the invention.

1 Claim, 20 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

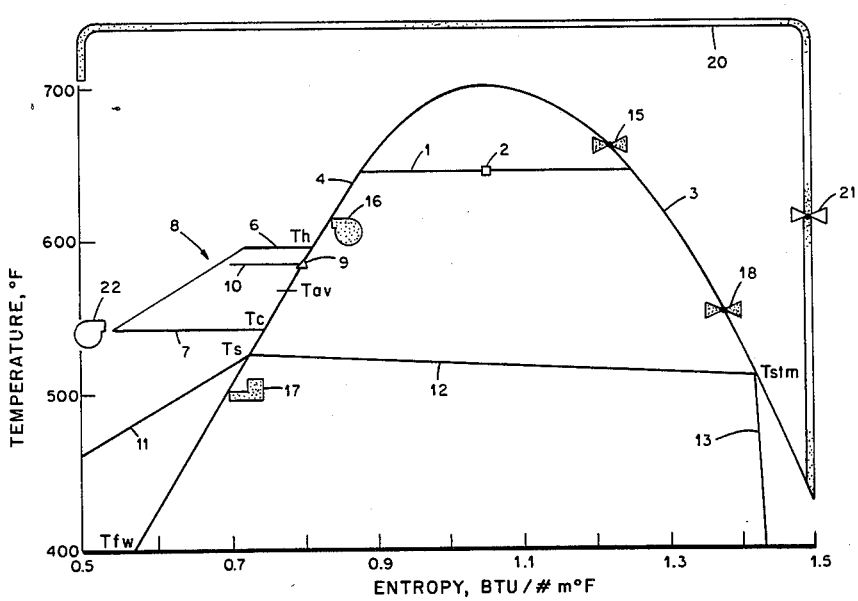

INTEGRATED ICONIC DISPLAY

BACKGROUND OF THE INVENTION

This invention was developed in the course of employment by the U.S. Nuclear Regulatory Commission.

Field:

This invention provides an integrated iconic display that greatly enhances the operator's ability to evaluate and control the operation of complex systems and apparatus such as nuclear electric power generating plants.

Background:

The design of control rooms and/or control stations from which complex systems and apparatus such as nuclear electric power generating plants are evaluated and controlled has evolved in a rather unorganized fashion over the years. Of paramount importance has always been is the providing of sufficient indicators, instrumentation and controls so that the operator(s) of complex machinery are able to cause the plant to respond to their control. This has been relatively easy to accomplish. What has proved to be difficult is providing the operator(s) with the ability quickly to discern the operating state of the plant so that proper operation and deviations therefrom are evident. The status of the plant at any given moment must be known so that both steady state operation and deviances therefrom can be observed and evaluated and suitable actions taken in response, if necessary.

The development and present state of the control rooms for nuclear electric power generating plants is a prime example of the state of affairs over which the present invention is an improvement. In a typical non-nuclear fueled electric power generating plant steam is generated by some heatproducing source such as fossil fuel. This steam, usually in saturated/superheated state, is expanded through a turbine which drives an electric power generator. There is a need to monitor at numerous places in the cycle such items as steam and water temperature and pressure, lubricating oil temperature and pressure, etc., as is well-known to those skilled in the art.

To do so, the plants contain a control room having literally hundreds of gauges, meters, lights, alarms, and controls. Operators must continuously monitor and evaluate the information displayed on the hundreds of indicators in order to determine and control the state of operation of the plant. To assist the operators, efforts have continuously been made to simplify the displays and controls, to group them according to various theories, and to provide means for analyzing and responding to certain conditions, especially emergencies. The objective is to reduce the magnitude of the burden placed upon the operator's mental process of analysis, evaluation, and reaction. Such means initially consisted of tabulated books, manuals and charts to which the operator could turn for reference in response to something he had observed that was going right or wrong in the control room. The primary purpose of these aids was that once the operator determines that an undesirable condition existed somewhere in the system by virtue of his observation of the gauges, he could find instructions on how to alleviate the condition. Computers soon assisted or replaced the printed page. Even when computer-assisted, reacting to an undesirable signal, especially an indication that an emergency situation is developing, requires the operator to scrutinize many gauges and conduct many mental evaluations and analyses. In an environment of clanging alarm bells, running and shouting personnel, and requests for information from superiors, the situation often reaches a state of chaos.

When the heat by which steam is manufactured is provided by a nuclear reactor, the situation described above is magnified greatly. First of all, a nuclear plant is much more complicated by the addition of the closed primary loop for the nuclear side of the plant. Second, the operator is now dealing with a much more dangerous instrumentality, which demands that any problem be analyzed and solved very quickly. Third, by virtue of the fact that nuclear energy is involved, outside observers, such as the government, the media, and the public are much more interested and concerned, which requires that the diagnosis and cure for the problem be accomplished quickly and properly, and which will be critiqued over and over after the incident has ended. While many designs for control rooms were promulgated and many aids of various types were created to assist the plant operators in monitoring, analyzing and controlling the plants, all consisted primarily of rearrangements of the prior multitudes of gauges and various written schemes that proposed to interpret certain of the gauge reading.

Then came the now famous incident at the Three Mile Island (TMI) nuclear plant. It became clear that part of the problem at TMI was rooted in the inability of the operators rapidly to determine exactly what was happening in the steam generating cycle, why it had happened, and the effect upon this condition of the action they were taking, or planned to take, to alleviate it. In the aftermath of the TMI incident, a considerable amount of study and analysis was directed toward the matters of control room design and the identification of discrepancies in man-machine interface. The importance of human factors engineering as a key ingredient in the operation of complex machinery such as nuclear power plants finally was realized. For example, in the traditional control room, in order to simply ascertain the state of the plant, the operator was burdened first with the collection of data from a multitude of one-sensor, one-indicator reference points, then with the task of data integration, and finally with an analysis/comparison of the functions to determine the status of the process. See Rasmussen, J., "SKILLS, RULES & KNOWLEDGE; SIGNALS, SIGNS & SYMBOLS AND OTHER DISTINCTIONS IN HUMAN PERFORMANCE MODELS," IEEE Transactions, Systems, Man and Cybernetics, June 1983. This type of operation is characteristic of the control rooms in nuclear power plants and the like, wherein analog based wired displays and control systems are used. An example is the annunciator-alarm system, which in terms of malfunction produces many visual and audible alarm signals to operators in times of stress, and can be coped with only by developing system and coding and integrating data into recognized patterns in an attempt to more easily identify the abnormal event. The entire process had to constantly be repeated, over and over, throughout the process of diagnosing a problem.

A logical step forward was the use of computers to assist the operator. An excellent example of the use of a digital computer to aid the operator in the collection, integration and analysis of multiple alarm data has been published. See Gimmy, Kris L. and Nomm, Enno, "AUTOMATIC DIAGNOSIS OF MULTIPLE ALARMS FOR REACTOR CONTROL ROOMS,"

ANS Annual Meeting, Los Angeles, Calif, June 6–11, 1982. The logic basis of pattern recognition is computer stored in the form of individual search templates for use in evaluating annunciator panels to identify abnormal plant responses. When a search template matches the annunciator display status, a CRT displayed message is provided to the operator. This type of aid is redundant to, but diverse from, the operator and thus common mode errors during abnormal events are minimized. This example is in sharp contrast with the typical use of the computer as an alarm logger which simply prints data on each alarm. In real time situations, the print out from an alarm logger can overwhelm overload the operators with data, which they must then mentally evaluate.

The problem of analysis and control is complicated at the supervisor level. The supervisor-type functions in nuclear power plant control rooms require the human to perform cognitive tasks. These functions, such as monitoring the safety status of the plant, require the supervisor to have an overview of the plant as well as a model of the plant to correctly interpret and diagnose plant data and initiate a response, if needed. For large control rooms, this requires the supervisor to access a central source of data and displays. From a human factors viewpoint, short term memory is overloaded if the human is required to collect and integrate data from many sources in a large control room.

It is against this background, and in pursuit of a solution to the above stated problems, that the present invention is directed.

SUMMARY OF THE INVENTION

Objects:

It is an object of the invention to provide a new and novel system for facilitating the evaluation of the operation of complex machinery such as nuclear electric power generating plants by a human operator based on an analysis of the physical fundamentals of the system. An equally important object of this invention is to provide a new and novel system for evaluating the operation of a nuclear electric power generating plant based upon a visual representation of the thermodynamic operating cycle.

Additional objects, advantages, and novel features of the invention will be set forth in the description which follows, and will become apparent to those skilled in the art upon examination of the following, or may be learned by practice of the invention.

The essence of this invention is the presentation of the operation of the machinery, such as a nuclear power plant, to the operator as an iconic display of the operating principles, upon which selected data obtained by actual sensing of the plant operation are superimposed, thereby allowing evaluation of the state of operation of the plant on the basis of graphic pictorial presentation rather than upon a collection of abstract data. The simplicity and effectiveness of such a presentation is overwhelming when compared to the prior art methods. The invention has an almost unlimited capacity for individualizing the concept to suit various situations and personal preferences, as well as the ability to "zoom in" on any particular portion of the operating cycle for more precise analysis at that point. Moreover, the invention utilizes state-of-the-art computer and related hardware and programming techniques, and can be back-fitted into existing plants to utilize the present sensing apparatus and systems.

DETAILED DESCRIPTION OF THE INVENTION

The basic concept of this invention is to monitor and control the operation of a system such as a steam generator in response to evaluating certain data presented in an iconic display along with the principles of physics or the like which govern the operation of the system. The invention is particularly well suited to use with steam electric power generating plants wherein the steam is provided by a nuclear reactor. It is in such an environment that the invention is herein described, although this is not to be considered a limiting factor, which will become apparent to those skilled in the art once having been educated by the invention disclosure.

The invention is best presented and explained by illustration. Therefore, the drawings presented herewith show the invention as it could have been applied in two real-life situations, an abnormal incident at the Ginna nuclear power plant in 1982, and the celebrated event in 1979 at Three Mile Island, Unit 2 (TMI-2), in Pennsylvania. In those two cases, as is virtually all power plants, the occurrence of such abnormal events presently is communicated to the control room personnel via the sounding of audible alarms, after which the operators must scrutinize numerous analog indicators to diagnose the exact nature and extent of the problem. There then follows the period of determining how to solve the problem, followed by the same scrutiny of indicators to see if the proposed solution is working. Had the system set forth in this invention been installed, the operators in those two cases would have had a clear, visual representation of what was occurring with regard to the thermodynamic cycle in the nuclear steam generator, from which analysis and evaluation would have been much easier. The results of actions taken in response to the abnormal event would have been visible on the iconics presentation to verify that the problem was being alleviated. Furthermore, by the use of computers, proposed solutions to the problem could quickly have been tested in simulation, thus eliminating trial and error on the plant itself, done at great risk and loss of valuable time.

THERMODYNAMIC FUNDAMENTALS

To provide a basis for the following discussion, a brief review of the thermodynamic properties of water is presented. Reference is made to the following text for the basic information concerning the subject: "THERMODYNAMIC PROPERTIES OF STEAM," Keenan and Keys, John Wiley and Sons, June 1950.

Figure 1:
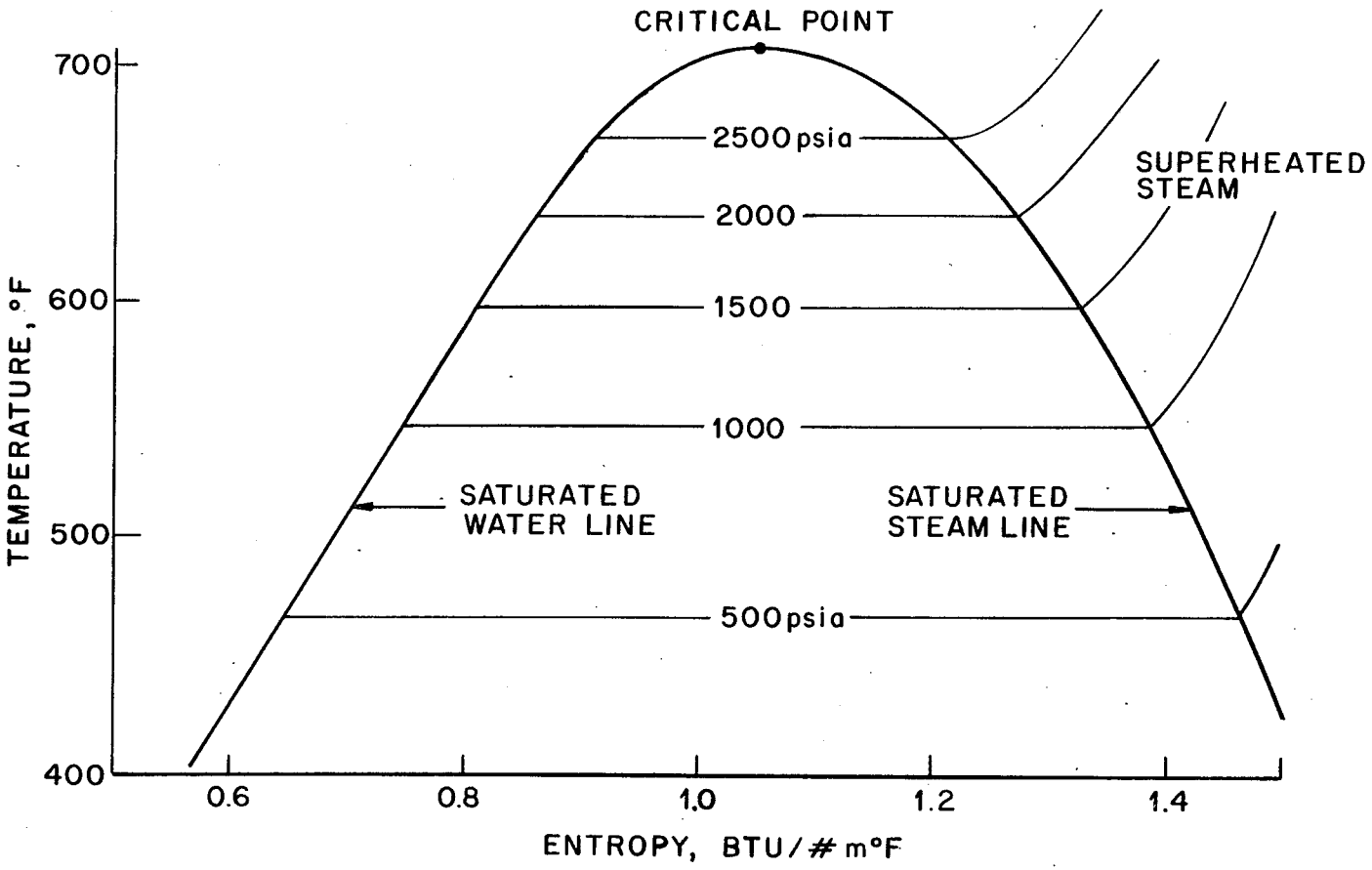
FIG. 1 is an iconic display in accordance with the invention showing the temperature-entropy properties of water.

FIG. 1 shows a temperature-entropy plot of water for temperatures above 400 F. The property of entropy is defined as the extensive factor of thermal energy. The liquid phase (liquid water) and the vapor phase (steam) are shown in FIG. 1. The saturated water line separates compressed sub-cooled water from the two phase region of water. In the two phase region, steam and liquid water co-exist. The saturated water line and the saturated steam line meet at the critical point (705.34 F., 3206.2 psia, 1.0645 BTU/#m F.), where the density of the liquid is the same as the density of the steam, thus the liquid phase and the vapor phase have common properties and are not distinguishable from each other.

Heat added to sub-cooled water increases its temperature, and with sufficient heat addition, makes it saturated water. The saturation temperature of water is a function of pressure. Compressed sub-cooled water as a function of temperature and entropy is not shown in FIG. 1 because of insufficient display resolution. An attempt to do so would result in the data being nearly coincident with the saturated water line.

When heat is added to saturated water, the liquid is converted to vapor (steam). The heat of vaporization, the amount of heat needed to convert a pound of water to steam, varies with pressure and is also proportional to the entropy change from saturated water to saturated steam. Note from FIG. 1 that the temperature and pressure properties of two-phase water are flat with respect to entropy. This characteristic is utilized in the iconic display discussed later. When all of the liquid water is converted to vapor, saturated steam exists. When heat is added to saturated steam, it becomes superheated and its temperature rises above saturation temperature.

Another parameter is needed to uniquely specify water in the two phase region (see FIG. 1) as temperature and pressure are level with respect to entropy. This new parameter is called the quality of the steam-liquid mixture and is defined as the mass of the steam divided by the combined mass of the steam and the liquid water in a volume. A quality of zero is used to describe the sole presence of saturated water in a volume whereas a quality of one is used to describe the sole presence of saturated steam in a volume.

ICONIC DISPLAY, STEADY STATE PLANT OPERATIONS

The Rankine Cycle is the thermodynamic power cycle of the secondary coolant loop of a pressurized water reactor (PWR). Subcooled feedwater fed to the steam generators is heated to saturation and with additional heat, converted to steam. The steam is used to drive the turbines. It is then condensed to water in the condenser and recirculated back to the steam generators. The heat source for the steam generators is the nuclear reactor. The heat sink for the condensers is the environment, for example, condenser cooling water.

Figure 2:
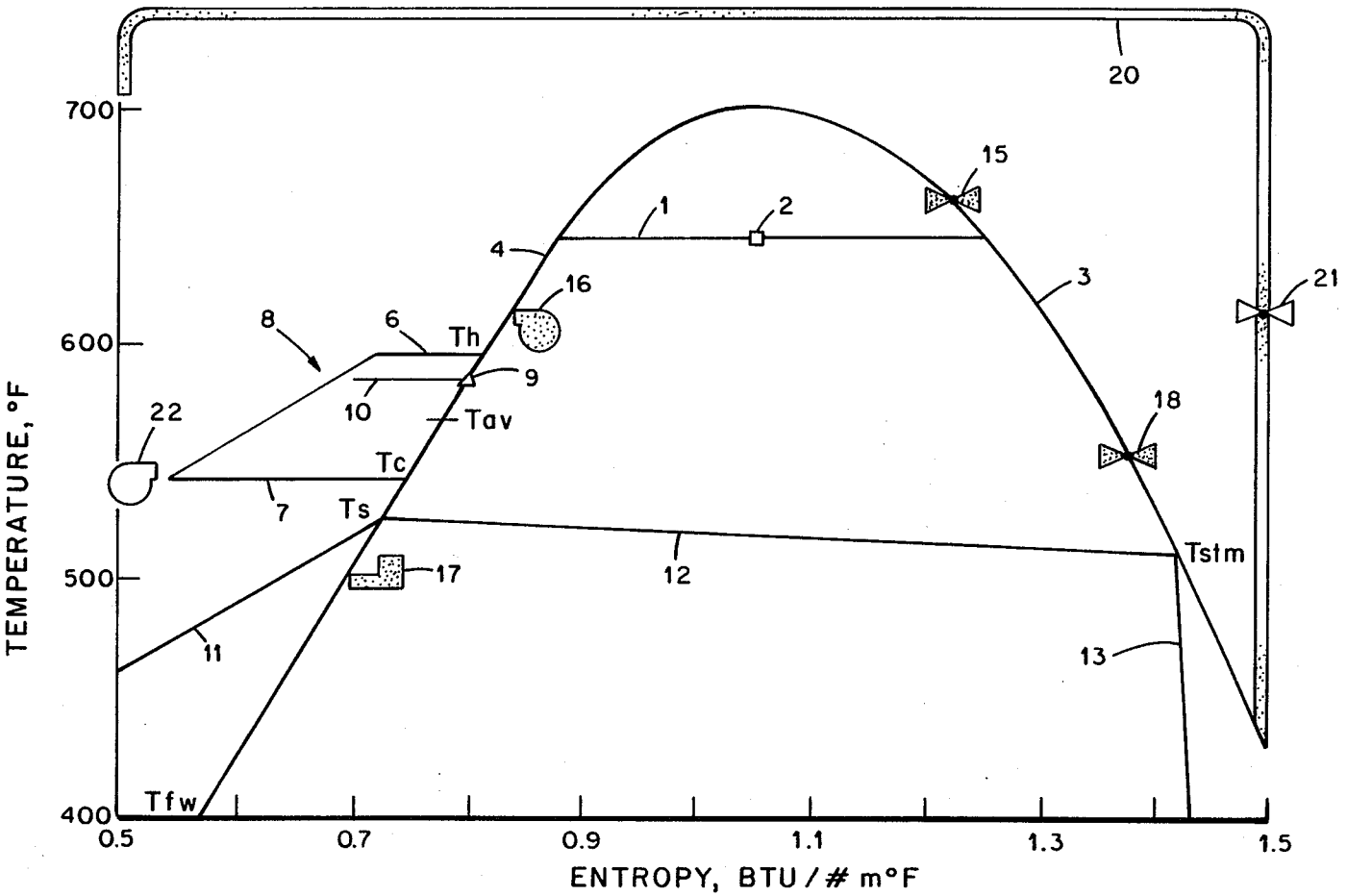
FIG. 2 is an iconic display of a typical steady-state nuclear power plant operation.
Figure 3:
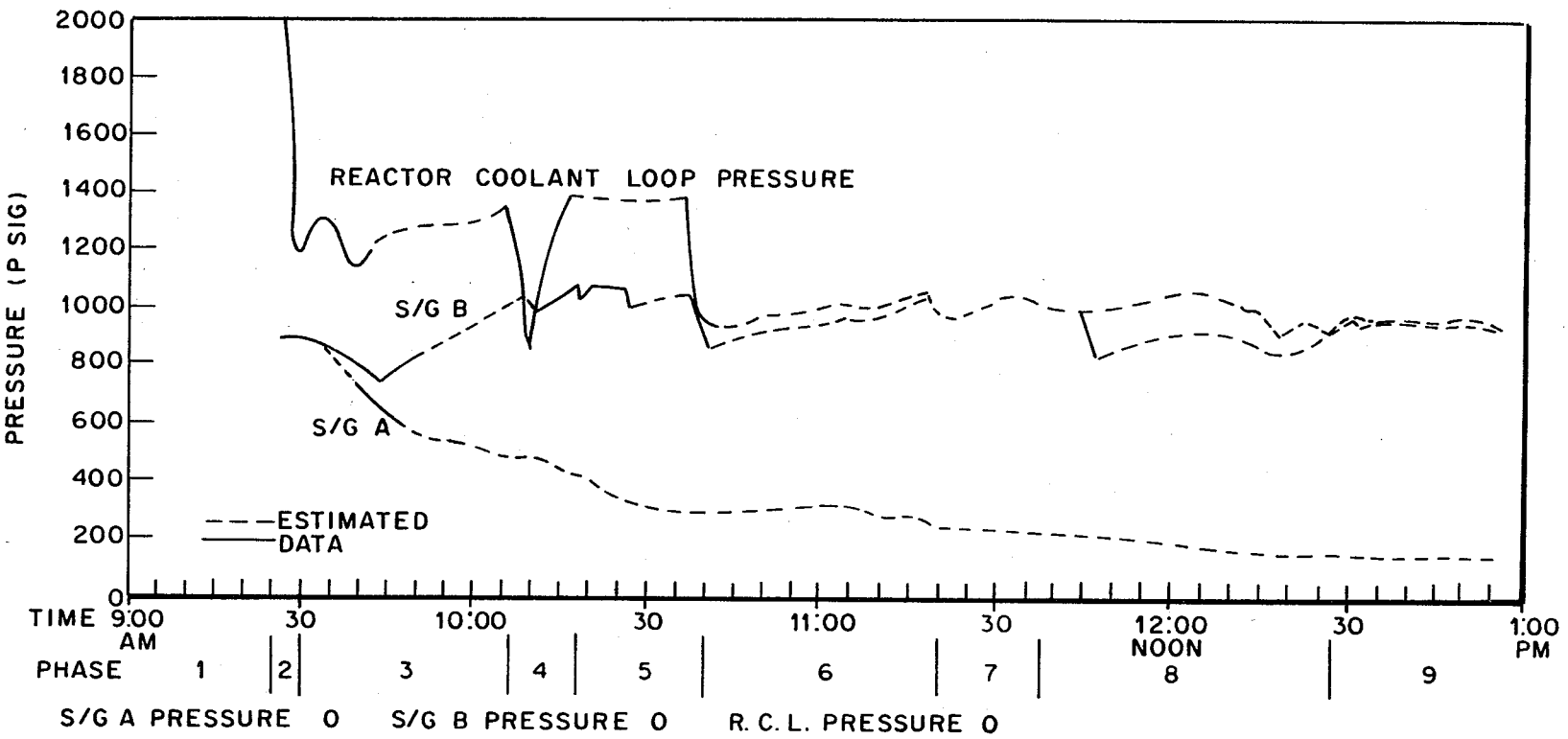
FIG. 3 is a graphical presentation of the reactor coolant system and steam generator pressure response during the abnormal event at the Ginna nuclear power plant, Jan. 25, 1982.
Figure 4:
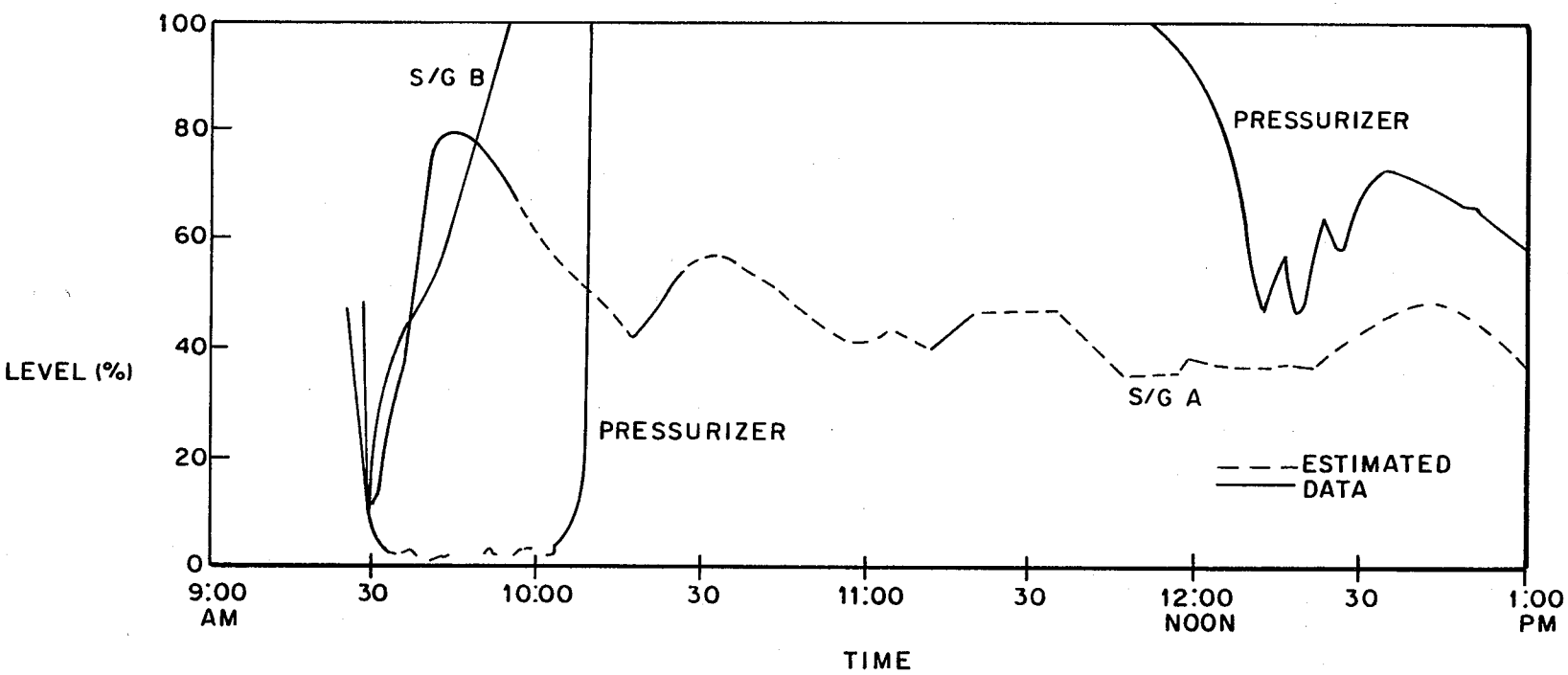
FIG. 4 is a graphical presentation of the pressurizer and steam generator level response during the abnormal event at the Ginna nuclear power plant, Jan. 25, 1982.
Figure 5:
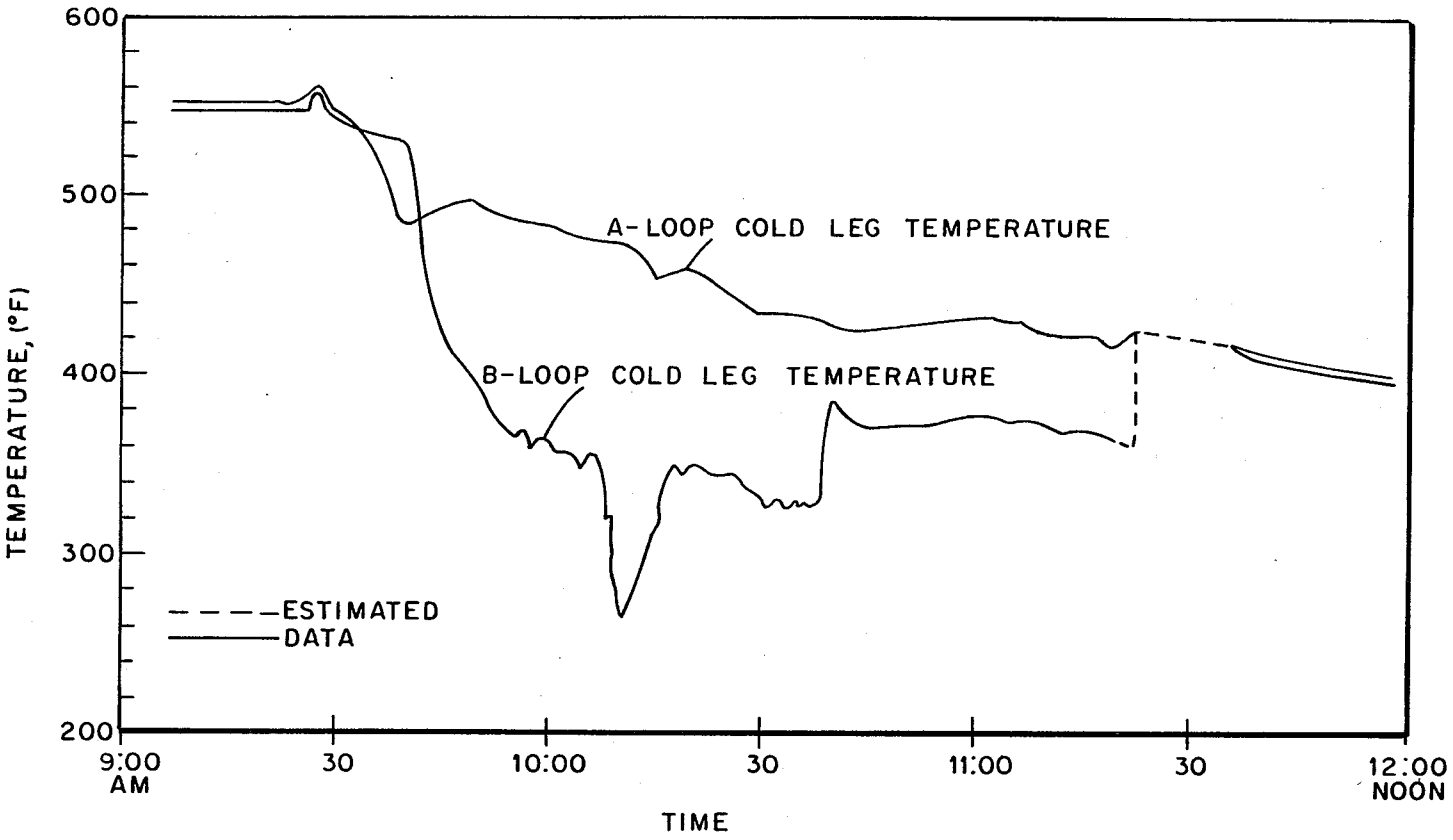
FIG. 5 is a graphical presentation of the reactor coolant loop cold-leg temperature during the abnormal event at the Ginna nuclear power plant, Jan. 25, 1982.
Figure 6:
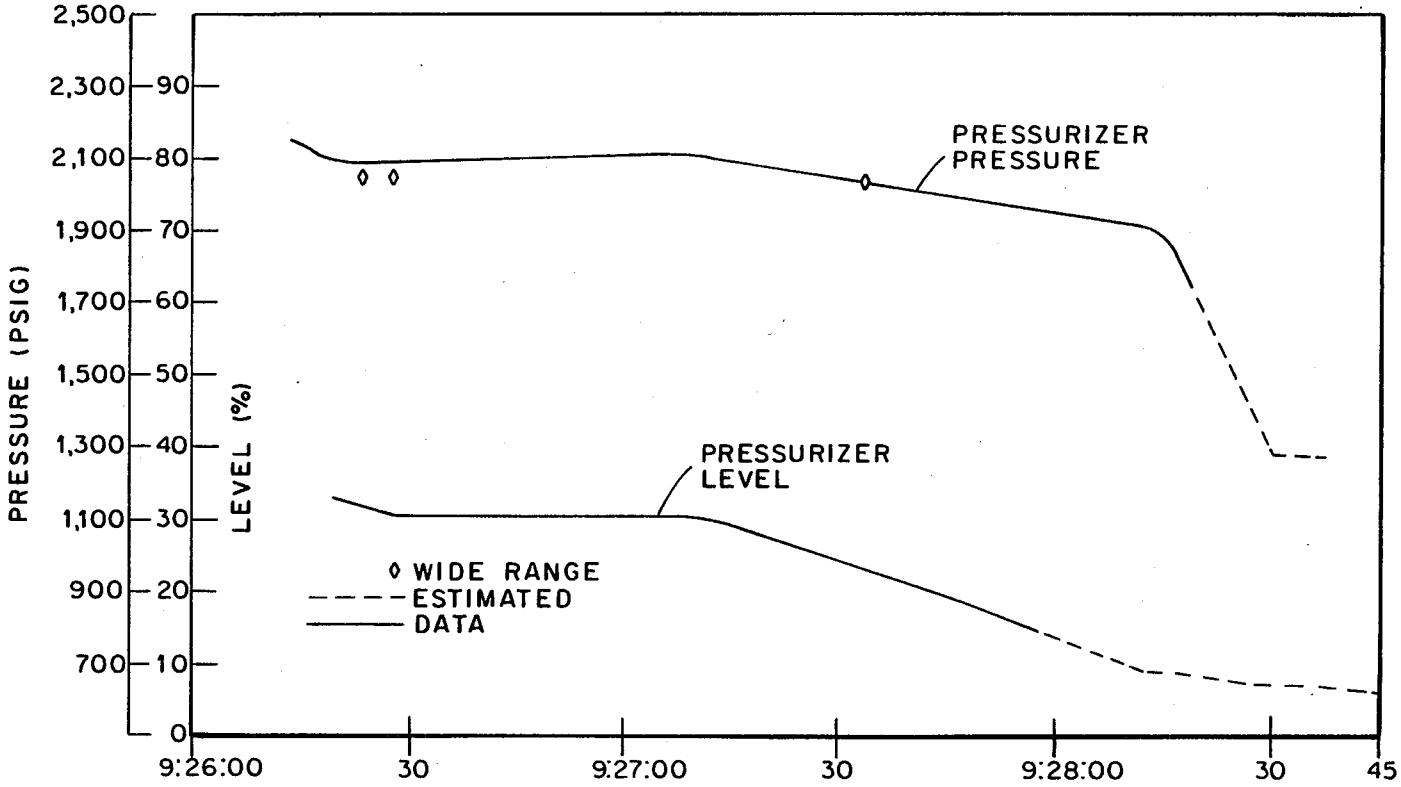
FIG. 6 is a graphical presentation of the initial depressurization, pressurizer level and pressure during the abnormal event at the Ginna nuclear power plant Jan. 25, 1982.

The iconic display in accordance with the invention contains the Rankine cycle plus other data. Part of the power cycle described above is shown in FIG. 2. This part consists of the heat transfer from the source, the reactor, to the steam turbines. The power cycle in FIG. 2 is described in terms of the temperature and entropy properties of water. The locus of the temperature-entropy properties of the primary coolant water (subcooled) at design power, and exclusive of the pressurizer water, form the line Tc-Th which for display purposes is co-incident with the saturated water line of the secondary loop. Reactor water inlet temperature, Tc=545 F., is heated to Th=600 F. as it flows through the nuclear reactor core. The entropy of the water increases during the process of heat addition in the core, from 0.74 to 0.815 BTU/#m F. This heated water then flows to the steam generators, where it is cooled to 545 F. by heat transfer to the colder secondary coolant. The entropy of the primary water decreases during the process of cooling in the steam generators, from 0.815 to 0.74 BTU/#m F. The cooled primary water is then recirculated to the reactor core by means of a pump. As shown in FIG. 2, the primary loop water flows from Th to Tc, giving up its heat, while the secondary water flows flows from Tc to Th, acquiring the heat. The temperature of the saturated water in the pressurizer is 650 F. and this water will be discussed at a later point.

FIG. 2 also contains portions of the secondary loop of a PWR. Subcooled feedwater, Tfw, is heated to saturation temperature, Ts=532 F. The locus of subcooled feedwater temperatures is for display purposes coincident with the saturated water line. The heat added to the subcooled feedwater is obtained from feedwater heaters and from the primary coolant in the steam generators. The saturated water in the steam generators is converted to steam by the process of boiling, along segment Tc-Th with the heat provided by the hotter primary coolant.

For steady state operation of the primary coolant flow, secondary coolant flows and reactor power, an indicator of the amount of heat transferred from the primary coolant to the secondary coolant is provided by noting the temperature difference between the average primary coolant temperature (Tav) and the saturated water temperature in the steam generators (Ts). The higher the Tav, the greater the heat being transferred from the reactor. Also, for these conditions of steady state operation, an indicator of reactor power is the temperature difference between the hot primary coolant (Th) and the cold primary coolant (Tc). With these data, the display provides operators with an easily recognized pattern which is related to the heat generated in the reactor core and the heat transfer from the primary coolant to the secondary coolant. Of course, this display pattern will vary with power level, but in a very structured, logical manner for normal operating conditions. The display pattern for abnormal operation is also easily recognized and will be discussed later.

However, the major point is the display elements form patterns which model the heat transfer process in the plant and thus may be used by operators to evaluate the status of process functions which impact the safe operation of the plant.

Continuing to refer to FIG. 2, a pressure drop in the secondary cooling water occurs across the boiling region of the steam generators. As the steam is less dense than liquid water, the steam flows at higher velocity than liquid water for steady state secondary coolant flow. The high velocity steam experiences frictional losses with the steam generator tubes and viscous drag and momentum losses from interacting with the slower moving, denser liquid water and these factors account for the pressure drop. As saturation temperature varies with pressure, the temperature of the saturated steam leaving the steam generators, Tstm=515 F., is less than the saturated water temperature, Ts=532 at the inception of boiling in the steam generator. After the steam leaves the steam generator, useful work is obtained by driving the turbines. This useful work results in a temperature and pressure drop of the steam to the condenser operating conditions (part of the drop is shown in FIG. 2). The steam is then condensed to liquid water and recirculated to the steam generators by means of hotwell and feedwater pumps. The major portion of this process is not shown in FIG. 2. However, it is well known to those skilled in the art.

The control room operator currently monitors the heat transfer process by means of control board displays. The process signals for many of the displays are also used in closed-loop process control systems. The operator must collect, integrate and evaluate data from several individual displays to evaluate a function, such as cooling of the reactor core. These tasks may be simplified through the use of an integrated display which groups individual data into functional display elements.

The integrated display is called an iconic display as it contains an image of the thermodynamic heat transfer process from a pressurized water nuclear power plant from heat source, the reactor, to the heat sink, the environment. Data from individual process sensors are integrated into display symbols which model the heat-transfer process. The background of the display format is a temperature-entropy diagram similar to FIG. 1.

The analysis used to develop the iconic display focuses upon the functions associated with the primary coolant system of a PWR, the steam generators, and many of the engineered safeguard systems associated with this portion of the plant. FIG. 2 shows the basic display format of the iconic as used to synthesize steady-state plant operation. The heat transfer process displayed in FIG. 2 has already been described. In order to describe a preferred embodiment of the invention, the display elements in FIG. 2 are numbered and discussed in sequence. A detailed description of the iconic display shown in FIG. 2 follows:

PRIMARY COOLANT SYSTEM

The primary system pressure is represented by the pressure bar 1. It is noted from FIG. 1 that a constant pressure in the two-phase region of water is a flat line. The operational pressure of the primary coolant for a PWR at design power is about 2200 psia. The pressure drop around the primary loop in small, on the order of 40 to 50 psi. For display purposes, the pressure bar 1 is shown as a flat line at 2200 psia (650 F. saturation temperature). The error created by doing this is small, since 50 psi is worth only about 3.5 degrees F. in saturation temperature at this pressure, and this small amount can be ignored.

The pressurizer, which is part of the primary system, contains saturated water, subcooled water, and steam at 2200 psia. The quality of the steam and liquid in the pressurizer could be represented by a symbol properly placed on the pressure bar. However, as quality is very nonlinear due to the large differences in steam density and liquid water density, the pressurizer water level is shown instead. The symbol 2 on the pressure bar 1 denotes the water level, with level proportioned to the distance between the saturated steam line 3 on the right and the saturated water line 4 on the left. Thermodynamically, this is a faux pas; however it greatly simplifies user comprehension of the displayed data. As shown, symbol 2 on the pressure bar 1 indicates that the pressurizer is about one-half full of water. If the symbol were to be moved to the left to the saturated water line 4, it would indicate that the pressurizer is full of water and empty of steam. If it were to be all the way to the right on the saturated steam line 3, it would indicate that the pressurizer is full of steam and empty of water. These display features serve as an operator aid to correctly interpret the status of the pressurizer.

A display is also created to code temperature data with the amount of subcooling of the primary coolant water, exclusive of the pressurizer. In the earlier discussion on FIG. 1, it was noted the representation of subcooled water is nearly coincident with the saturated water line. This is why the heating process of the primary coolant in the reactor is shown as the line Tc-Th (a process line 4) coincident with the saturated water line. Because line Tc-Th is coincident with the saturated water line 4, it is difficult to determine if the primary water is subcooled.

The sub-cooling of the bulk core coolant outlet water is proportional to the length of the horizontal line 6 emanating leftward from indicator Th located at the core exit temperature (600 F.) on the saturated water line 4. This display logic also holds for the core coolant inlet water, a line 7 emanating leftward from indicator Tc. Thus, a polygon symbol 8 is created in the display to the left of the saturated water line 4, as a locus of the primary coolant temperatures and subcooling of the primary coolant, exclusive of the pressurizer. The vertical distance between the pressure bar 1 and the temperature of an element of the primary coolant is proportional to the sub-cooling of the element, since the pressure bar 1 is at the saturation temperature of the primary coolant.

Element 9 indicates the upper head water in the reactor pressure vessel. As shown, the temperature of the upper head water is 590 F. and the amount of subcooling is proportional to the length of the horizontal line 10 emanating therefrom to the left of the saturation line 4.

STEAM GENERATORS

Line 11 represents subcooled water in the steam generators. This subcooled water is heated to saturated water by heat transfer from the primary coolant.

Line 12 represents the two-phase mixture region of the steam generators. Water is converted to steam by heat transfer from the primary coolant.

Line 13 represents the expansion of steam in driving the turbines.

ENGINEERED SAFEGUARDS AND OTHER COMPONENTS

Valve symbol 15 represents the closed safety valves on the pressurizer. Valve symbol 15 is located on the saturated steam line 3 at the actuation setpoint pressure. The reason for locating the valve symbol 15 on the saturated steam line 3 is that, normally, steam flows through the open valve. The shaded displayed valve symbol indicates that the valves are closed.

The safety water injection pump symbol 16 is located on the saturated water line 4 at the actuation setpoint pressure (1740 psia). The shaded displayed symbol indicates that the pumps are inoperative.

The accumulator symbol 17 is also located on the saturated water line 4 at the actuation setpoint pressure. The shaded displayed symbol indicates that the accumulators are full of water.

The steam generator safety valve symbol 18 is located on the saturated steam line 3 at the actuation setpoint pressure. Again, the shaded displayed symbol indicates that the valves are closed.

The shaded ribbon 20 which borders the display along the top and right edge of FIG. 2 represents the containment that encloses the process. The valve symbol 21 in the ribbon is used to indicate the isolation status of containment. This valve symbol 21 is shown at the same horizontal display level as the safety injection water pump symbol 16 because containment should be isolated upon actuation of safety water injection.

Symbol 22 denotes the operational status of the primary coolant pumps, which are located in the cold legs of the primary coolant system. The unshaded displayed symbol indicates that the pumps are operational.

The iconic display format shown by FIG. 2 is truly an integrated display. Primary and secondary coolant temperatures and pressure data are integrated into easily recognized symbols. The relationship between the various symbols is dynamic; it indicates to the operator instantly the status of the steam generating loop.

While the general construction of the iconic in accordance with the invention should be as shown in FIG. 2, such shall not be considered to be limiting. Items other than those described, or in addition to those described, could be placed upon and integrated into the display. Described above are elements that allow the operator to "see" the amount or level of key items regarding the operation of the plant alone and in relation to each other, so that deviances, differences, and defined relationships can easily be discerned and evaluated. Two graphic demonstrations of how this can indicate the presence of undesirable conditions and "track" an event as it occurs will be discussed below. The iconic described in FIG. 2 allows the operator directly to assess the more critical safety concerns, such as the functioning of the overall system and the state of the core, quickly and easily. This is highly preferred over the present system, which for the most part necessitates that an operator scan many gauges and indicators, and evaluate the various levels and relationships in his own mind, in the abstract. Even considering the modern manuals and computers to assist, the visual display provided by the present invention is obviously superior.

The information by which the various lines and symbols are placed to construct the iconic presentation is obtained from the sensing system installed in each plant, which presently produce the readings seen on the gauges and/or operate the various alarms. By the use of state-of-the-art computers and programs, the selected items can be measured and provided on a real time basis to the iconic display. Such would be well within the scope of one skilled in the art.

Other human factors points should be noted about the iconic display. The use of a color CRT as an interface allows for color coding of data and information in addition to the shape coding of data. For example, the saturated water line 4 could be colored blue and the saturated steam line 3 colored white to serve as aids for humans. Also, the integration of large quantities of sensor data into display symbols relieves the operator's short-term memory in having to collect and integrate the data. This makes the operator more effective as efforts may now be concentrated upon evaluation of the displayed data and decision making tasks. Owing to the sophistication of state-of-the-art computers and programs, the iconic could be augmented by presenting all or part of it in three dimensions.

It is also within the scope of this invention to provide for the magnification of any part of the iconic so that, for example, temperature could be very accurately read and relationships of elements examined in great detail. This might be advantageous when scrutinizing a situation in which broad comparisons or considerations would be undesirable.

Another very advantageous application of the inventive concept is to use it as a means for testing proposed solutions and/or predicting what would happen to the plant if certain conditions were to exist. To accomplish this, the computer and the display system would have to be equipped with a simulation ability with manual inputs. This is well within the scope of one skilled in this art. Thereby, in the case of an actual emergency, for example, a proposed solution can be tested by freezing the real-time input to the iconic display, introducing the proposed solution manually, and then drawing the iconic display by means of the simulator to ascertain the effect of the correction to the plant. This would be a valuable asset in terms of actual emergency, and could also be used regularly as a teaching aid.

Another very advantageous application of the integrated display is to use it as a means for monitoring the performance of the heat engine cycle. Abnormal behavior of plant systems would exhibit themselves in the heat engine cycle. The scope of the iconic display would be expanded to encompass the heat transfer process from the heat source, the reactor, to the heat sink, the environment. The heat transfer process in the steam condenser and the heating of the feedwater would employ the same display principles used to illustrate the operation of the steam generator and the heating of primary coolant water in the core. Moreover, the addition of control system mimics to the iconic display, such as the primary coolant system makeup water system, updated with the current status of valves and pumps, allows the operator to monitor the performance of the system by viewing the pressurizer water level. Such would be well within the scope of one skilled in the art.

Another advantageous application of the integrated iconic display is to use it as a means to moniotor the removal of afterheat from the reactor core subsequent to a reactor trip. The removal of afterheat must be sustained to prevent damage to the reactor core. The heat removal cycle is the basic heat cycle in a nuclear power plant which best describes the function of the Engineered Safeguard Systems. During abnormal transients and accidents, the Engineered Safeguard Systems remove afterheat from the core to prevent a meltdown of the fuel and the release of radiation. The removed heat is ultimately transferred to the environment and the cycle is defined in display symbols similar to the heat engine cycle described above. The Engineered Safeguard Systems are also mimiced in a manner similar to the primary coolant water makeup system described above. Such would be well within the scope of one skilled in the art.

The integrated iconic display illustrated and discussed herein applies to a pressurizer water reactor. The display principles discussed may also be used to generate integrated iconic displays for boiling water reactor nuclear power plants and for fossil power plants. Such would be well within the scope of one skilled in the art.

ICONIC DISPLAY—TRANSIENT PLANT OPERATIONS

A major function in the use of the iconic display set forth herein for transient operations is the pressure bar 1. The pressure bar 1, in its position for steady state operation, is a measure of primary system integrity. The pressure bar responds to the occurrence of plant transients in most cases. In the iconic presentation, the movement of the pressure bar 1 can be coordinated with a pressure sensitive safeguards symbol (not shown). If the pressure bar crosses the safeguards symbol, the plant must respond to the transient condition by making an adjustment, automatic or manual. If the response does not occur, this could mean a failure has occurred in that component or system, or that the operators have not reacted properly. Thus operational rules for the behavior of safeguard components have been integrated into the display. This should serve as a significant aid to operators during severe transients.

The use of the pressure bar in the iconic display is heavily stressed. This bar allows for the encoding of data on two-phase regions in the primary system in a manner which is related to the thermodynamics in the process. This data, in addition, to the other process and safeguards data integrated into the display, serves to structure the operators use and evaluation of safety functions. Finally, from a human factors point of view, the most important data on core safety is located in the center of the iconic with supporting data and symbols structured around this area.

EXAMPLES OF THE INVENTION APPLIED TO ACTUAL NUCLEAR PLANT EVENTS

Figure 13:
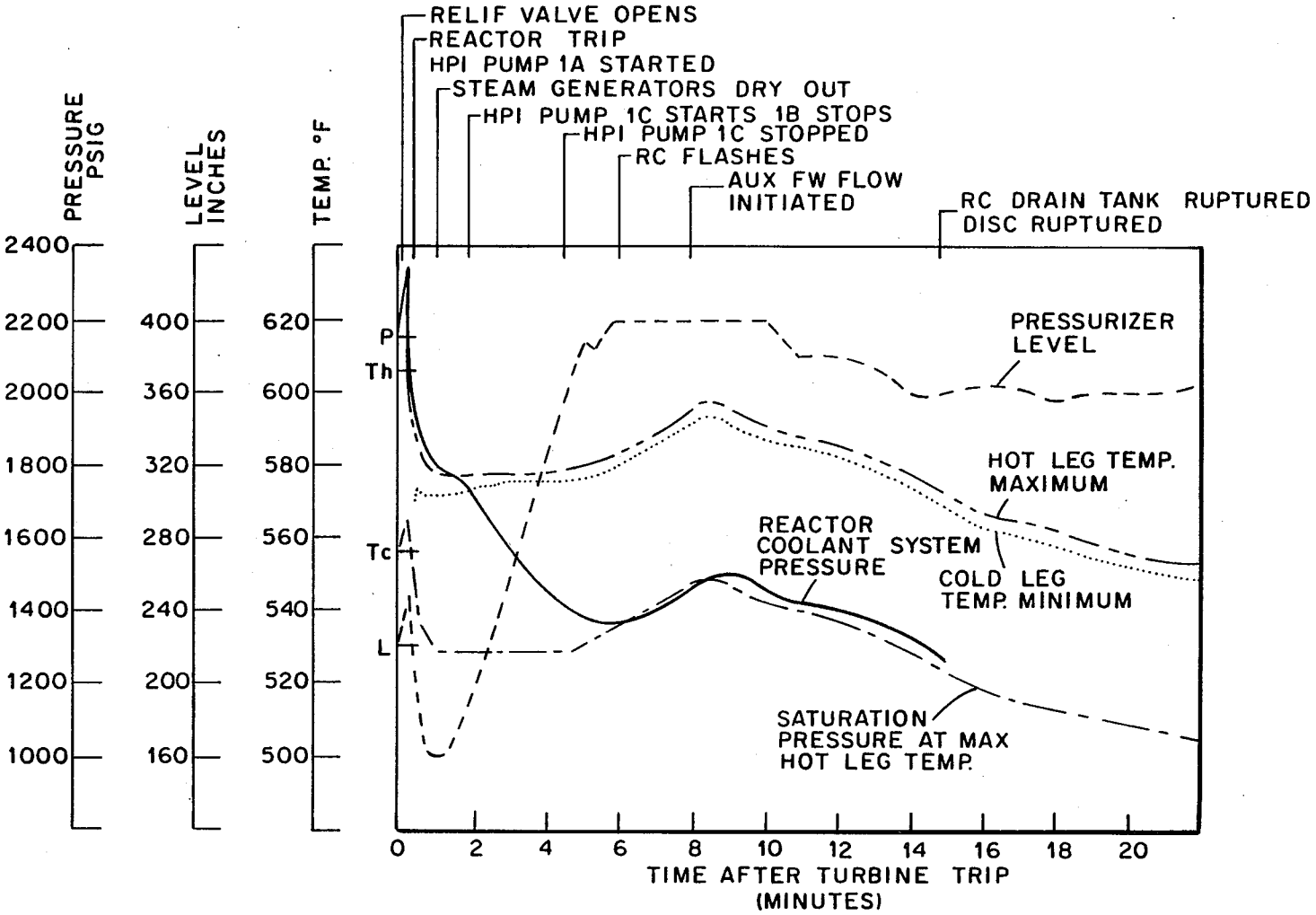
FIG. 13 is a graphical presentation of the reactor coolant system parameters in hours after turbine trip during the abnormal event at the Three Mile Island, Unit 2, Mar. 28, 1979.
Figure 14:
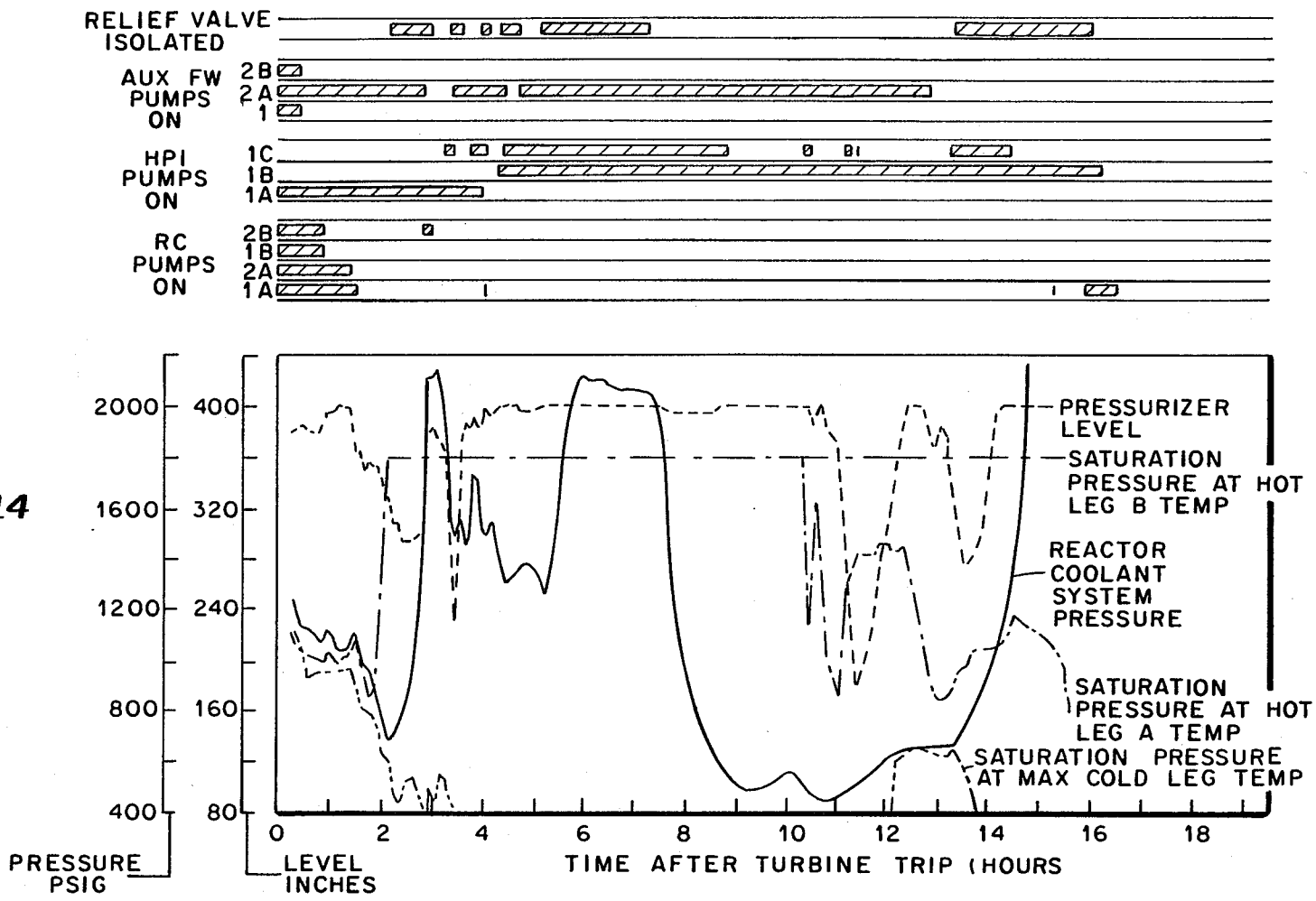
FIG. 14 is an iconic display in accordance with the invention of TMI-2 prior to the beginning of the abnormal event, Mar. 28, 1979.

Presented below are two examples of how the inventive iconic display would have reacted under actual conditions. In this fashion, the advantage of using the invention is clearly illustrated. FIGS. 3 through 6 present actual data acquired during the steam generator tube rupture at the Ginna nuclear power plant on Jan. 25, 1982. FIGS. 7 through 12 show what would have been presented on an iconic display in accordance with this invention, if such had been in place at that time. Likewise, FIGS. 13 and 14 show the actual data acquired during the famous incident at Three Mile Island on Mar. 28, 1979, and FIGS. 15 through 20 show how the event would have appeared on the inventive iconic display. To those skilled in the art, it should be apparent that the presence of the inventive iconic displays would have been a great help to the operators, enabling them to observe the incident pictorally from the thermodynamic point of view, rather than merely abstractly observing dozens of readings on gauges and indicators, and then attempting either to construct a thermodynamic picture in their minds, or alternatively simply reacting to indicators without really understanding what was happening to the thermodynamic cycle. The numerals on all of the Figures correspond to those on FIG. 2, and reference can be made to the explanation of the invention with regard to FIG. 2.

ICONIC DISPLAY SYNTHESIS OF THE JAN. 25, 1982 STEAM GENERATOR TUBE RUPTURE AT R.E. GINNA

The Nuclear Regulatory Staff's evaluation of this event is set forth in NUREG-0919, "NRC REPORT ON THE JANUARY 25, 1982 STEAM GENERATOR TUBE RUPTURE AT R.E. GINNA NUCLERA POWR PLANT," Apr. 1, 1982. As a summary overview of the event, FIGS. 3 through 6 (taken from NUREG-0909) define the response of key plant parameters. Data from these figures as well as from the plant computer were used to construct the iconic display formats presented herein. A brief discussion on each iconic display format follows.

Figure 7:
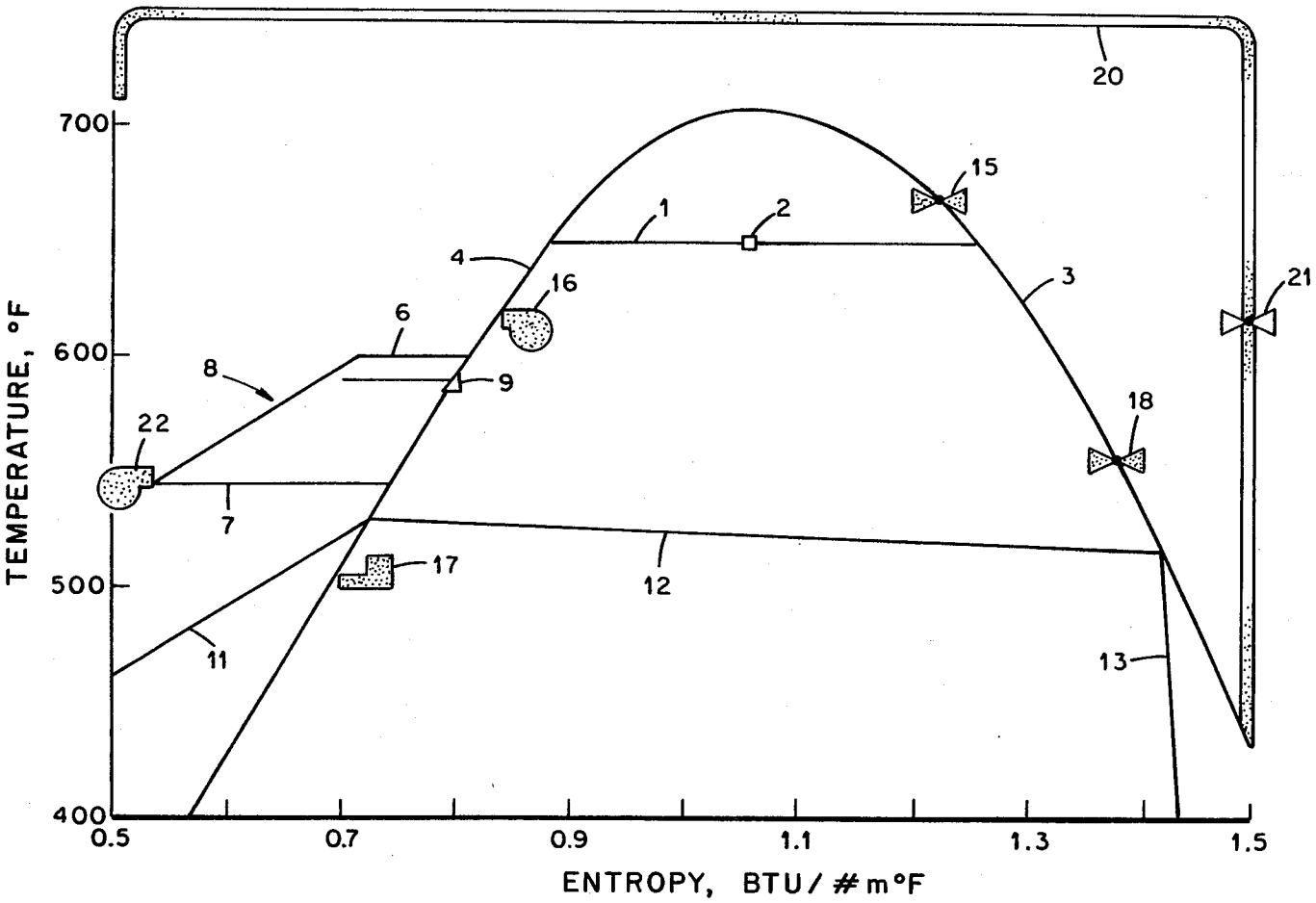
FIG. 7 is an iconic display in accordance with the invention of the Ginna nuclear power plant at 100% power, steady state, prior to the abnormal event.

FIG. 7 presents an iconic display in accordance with the invention of the steady state status of the primary coolant, steam generator secondary coolant and several engineered safeguard components. The time is approximately 9:25 AM, Jan. 25, 1982. The plant process and the safeguards components are in a normal state for full power operation.

Figure 8:
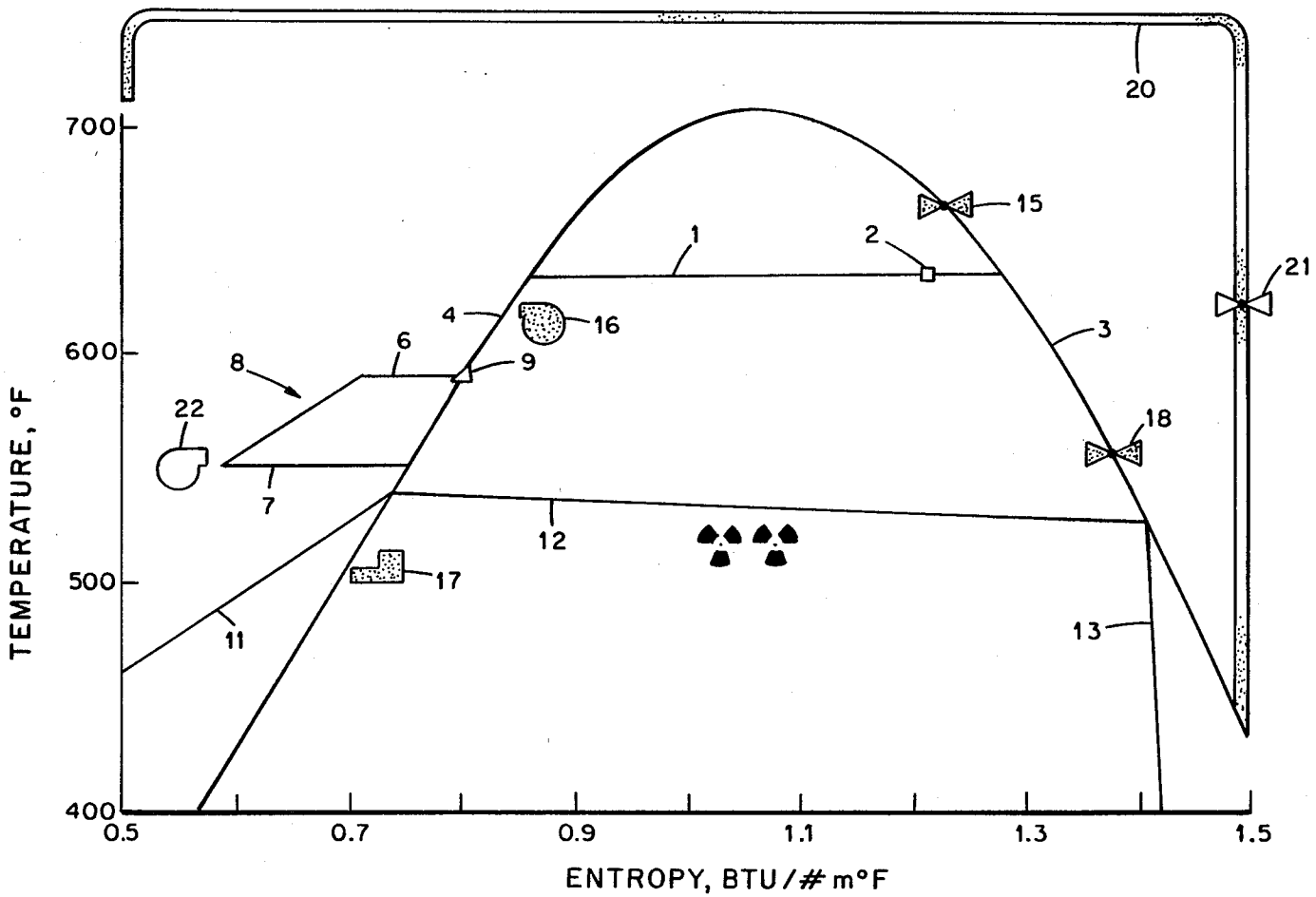
FIG. 8 is an iconic display in accordance with the invention of the Ginna nuclear power plant at the outset of the abnormal event.

FIG. 8 shows the state of the plant prior to any reaction by the control systems (known in the art as the pre-trip state), but after the initial rupture of the steam generator tubes. The time is approximately 9:28 AM. Movement of symbol 2 to the right toward the saturated steam line 3 indicates that the pressurizer is emptying of water because of the rupture and primary pressure is falling, as indicated primarily by the pressure bar element 1 dropping vertically. Compare both to FIG. 7. Radiation has been detected in the condenser air ejectors as is indicated by the presence of the radiation signs on the iconic display. This indicates that a steam tube has ruptured.

Figure 9:
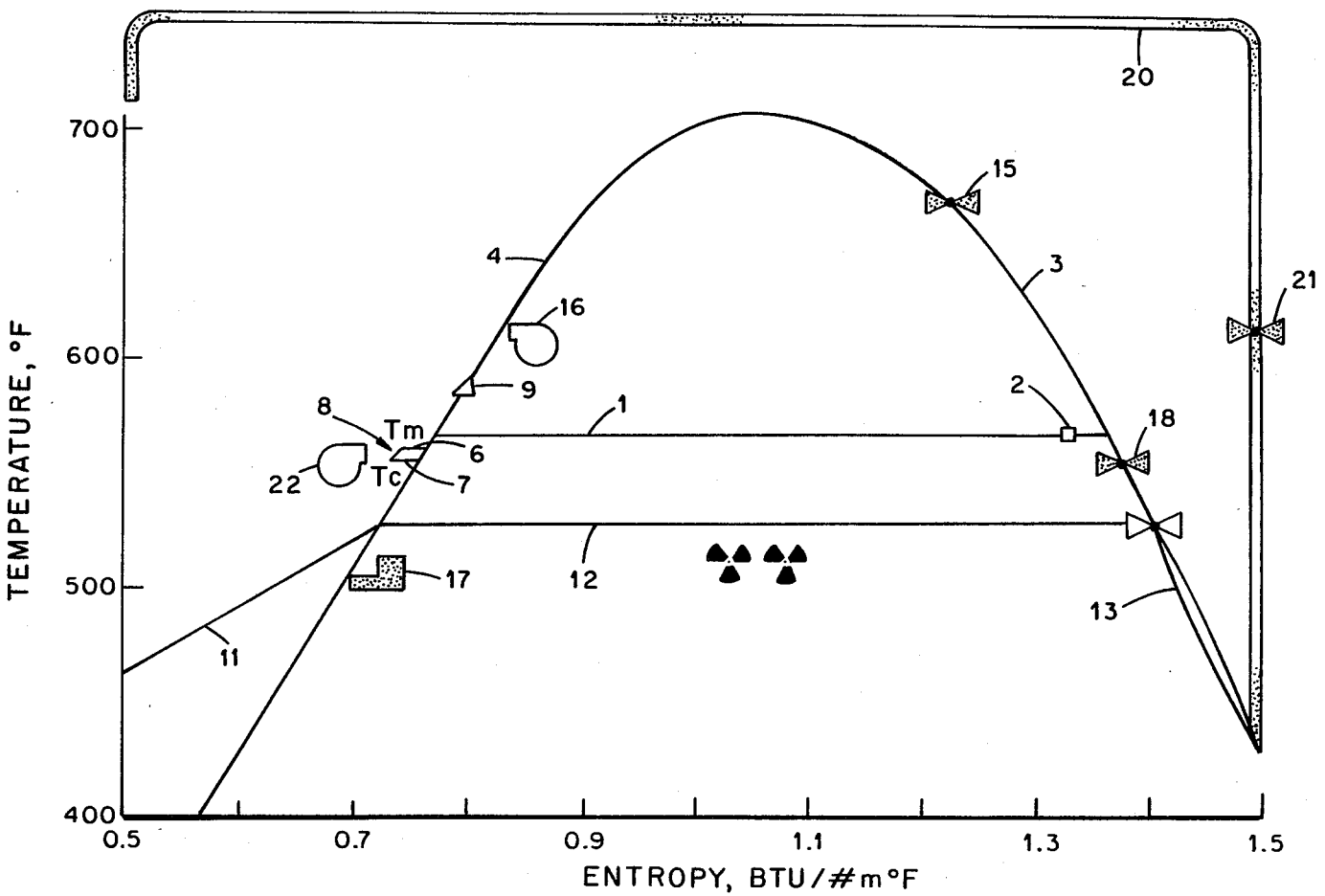
FIGS. 9 through 11 are iconic displays in accordance with the invention of the Ginna nuclear power plant at points in time as the abnormal event proceeded.

FIG. 9 presents the post-trip state of the plant. The reactor tripped in response to sensing the low primary system pressure. Safety injection has been activated and the containment has been isolated, as indicated by the safety water injection pump symbol 16 and valve symbol 21. The pressurizer is nearly empty of water (note the position of symbol 2) and the reactor pressure vessel upper head water is estimated to be superheated (no data could be found to verify this). Flashing of the superheated water starts near the minimum primary coolant pressure as saturation temperature falls with pressure. Note also the temperature rise of the primary coolant across the core (Th-Tc) is very small because of the reactor trip and the full coolant flow.

Figure 10:
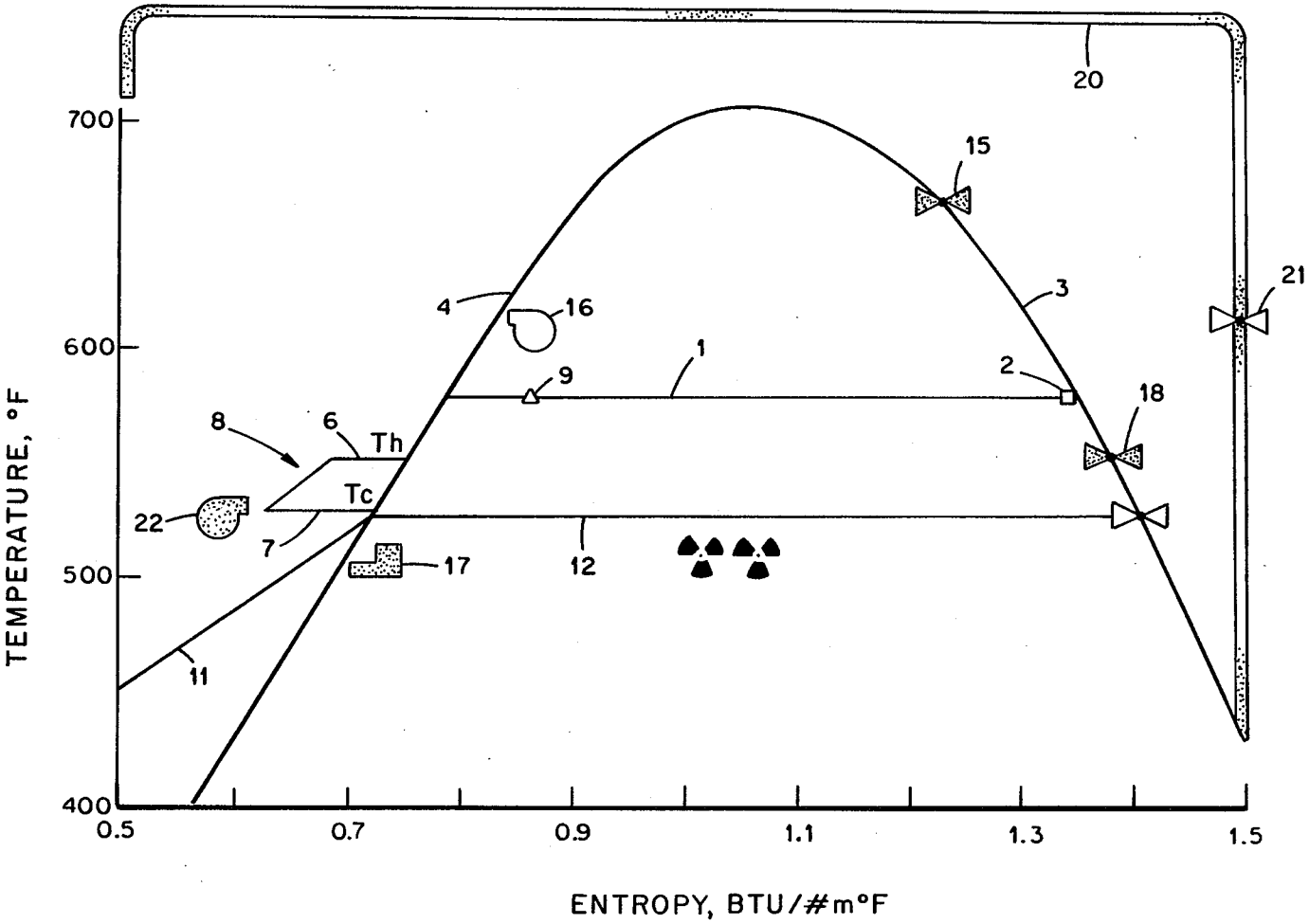

FIG. 10 presents the status of the plant shortly after the primary pumps have been tripped. A reactor pressure vessel water level sensor is needed to properly locate the vessel water level symbol 9 along the pressure bar. The temperature rise of the coolant across the core helps establish natural circulation. It should be recognized that the natural circulation is a safe condition which can function properly only so long as the power operating requirements of the plant are very low.

Figure 11:
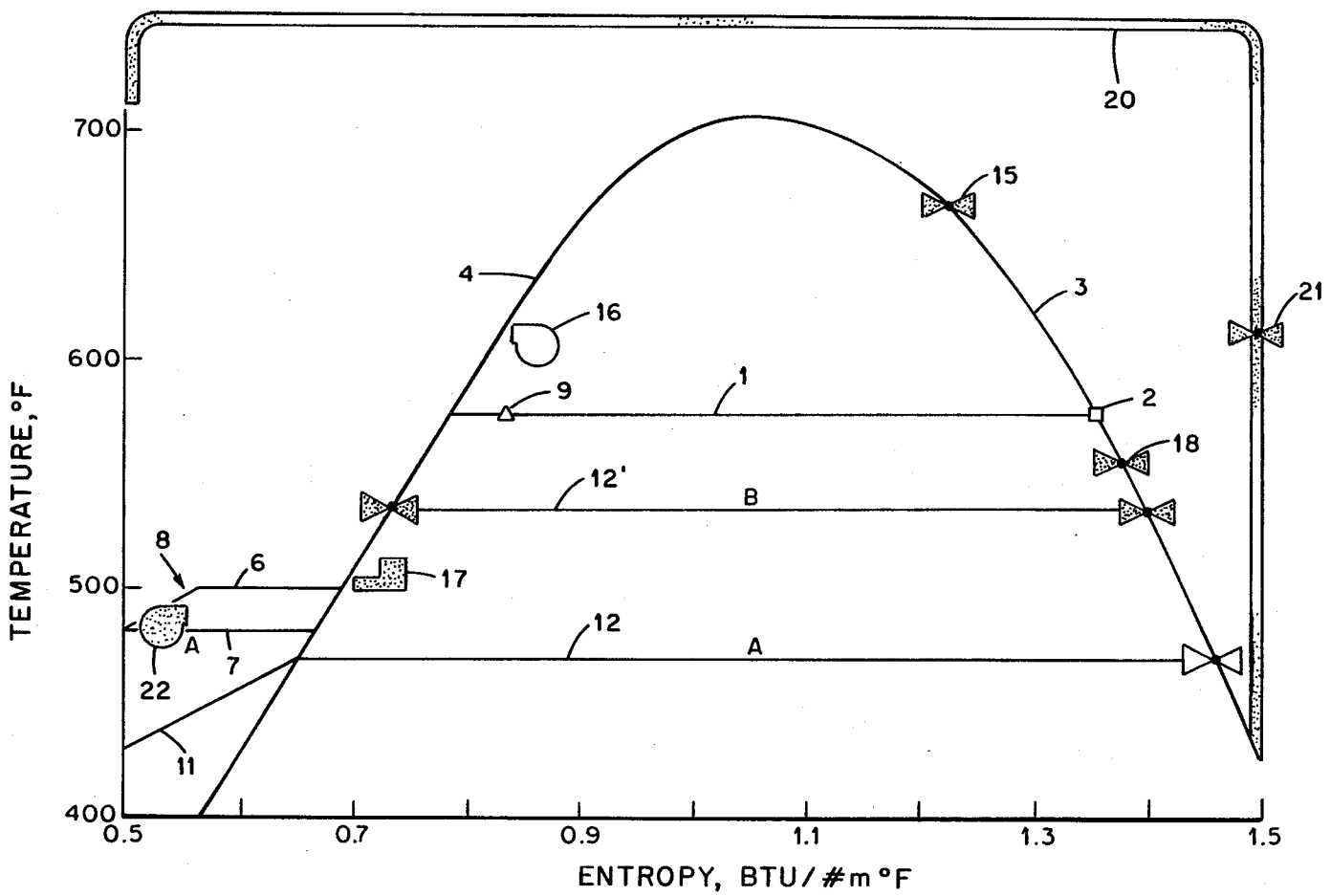

FIG. 11 presents the status of the plant with the B steam generator isolated and with cooling of the core by heat transfer to the A steam generator.

Figure 12:
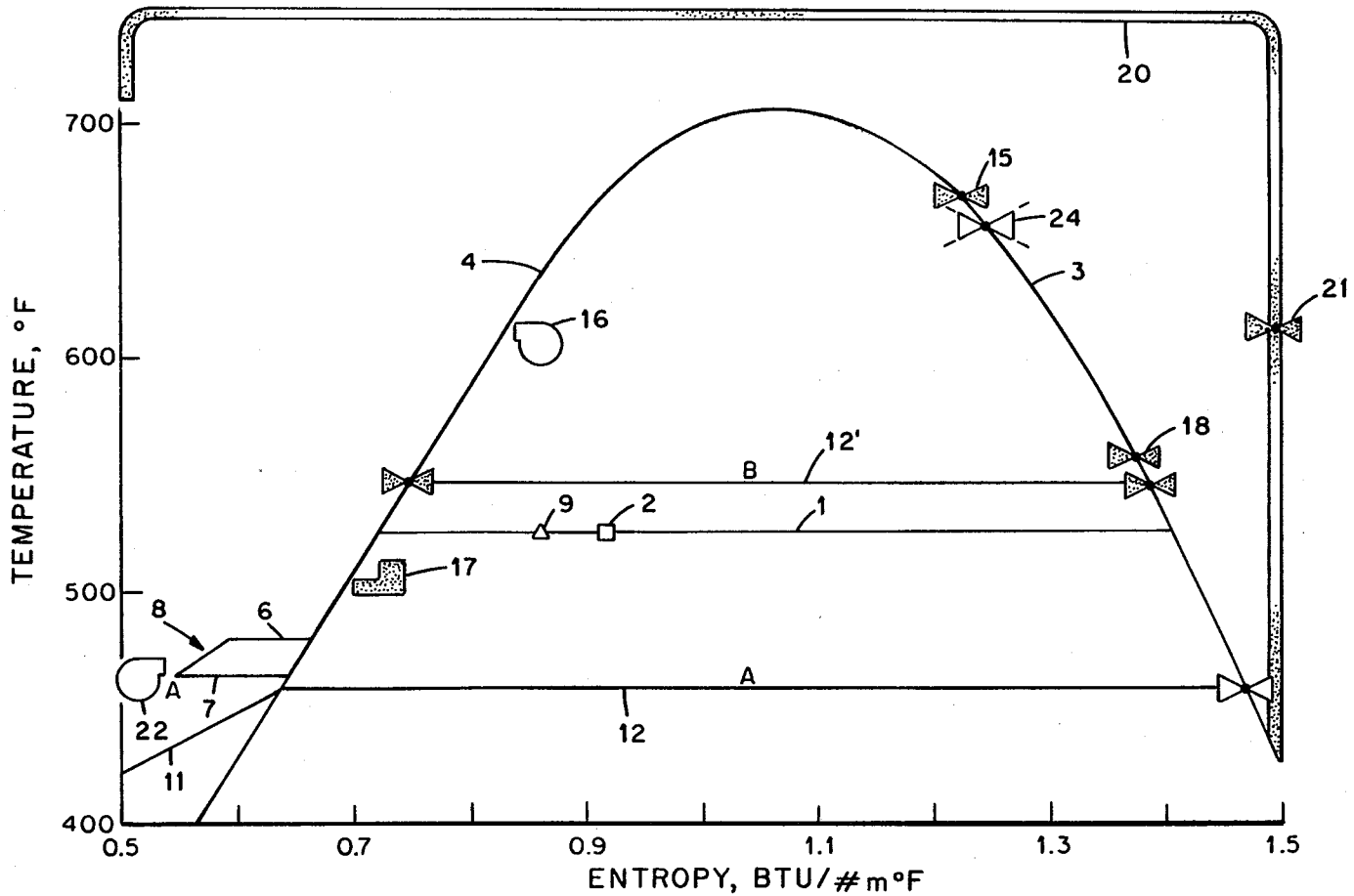
FIG. 12 is a graphical presentation of the reactor coolant system parameters after turbine trip during the abnormal event at Three Mile Island, Unit 2, Mar. 28, 1979.

FIG. 12 presents the status of the plant at the instant of minimum reactor pressure during the period when the pressure operated relief valve indicated as 24 (PORV) was stuck open. Note that B steam generator pressure is higher than the reactor coolant system pressure (also see FIG. 2).

The series of iconic displays formats described above are for specific instants of time during the event. This allows for a static evaluation of the display formats. A dynamic evaluation of the display, such as the display driven by a simulator, would also be useful. However, the display formats shown in FIG. 7 to FIG. 12 clearly illustrate large changes in patterns which are useful to human operators to monitor and diagnose events which occur in the plant.

Iconic Display Synthesis of the Mar. 28, 1979 Three-Mile Island Accident

The Nuclear Regulatory Commission Staff's assessment and evaluation of the TMI accident is set forth in NUREG-0560, "STAFF REPORT ON THE GENERIC ASSESSMENT OF FEEDWATER TRANSIENTS IN B&W PWRs," May 1979, and NUREG-0600, "INVESTIGATION INTO THE MARCH 28, 1979 THREE MILE ISLAND ACCIDENT BY OFFICE OF INSPECTION AND ENFORCEMENT," August 1979. Details of the plant's characteristics and the analysis of the event are in these and other references published during the 1979-1980 time frame. FIGS. 13 and 14 (from NUREG-0560) define the response of key plant parameters for the event. Data from these figures and from NUREGS 0560 and 0600 were used to construct the iconic display formats contained herein. Plant data on steam generator response was not available. This results in an iconic display based solely on primary coolant data. A short discussion of each iconic display format follows.

Figure 15:
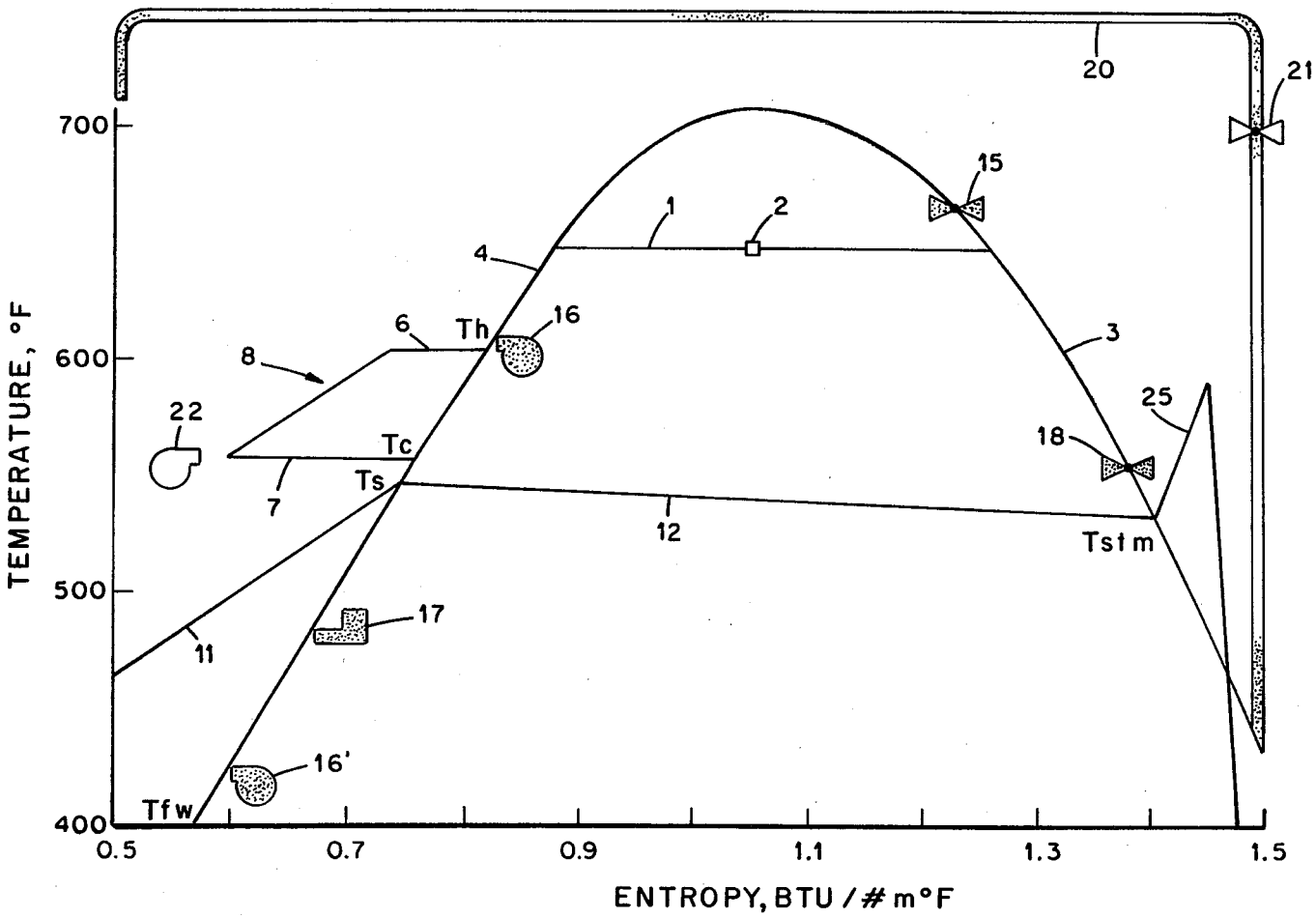
FIGS. 15 through 20 are iconic displays in accordance with the invention of TMI-2 at points in time as the abnormal event proceeded.

FIG. 15 presents the steady state status of the plant prior to the event. Note the superheated steam 25 at the steam generator outlet. The operating characteristics of the once-through steam generator are different from the operating characteristics of the U-tube steam generator and account for the superheated steam from the once through steam generator. Also, containment isolation only occurred on 4 psig containment pressure, thus the safety injections (SI) pump 16 and the containment isolation symbol 21 are not geometrically correlated.

Figure 16:
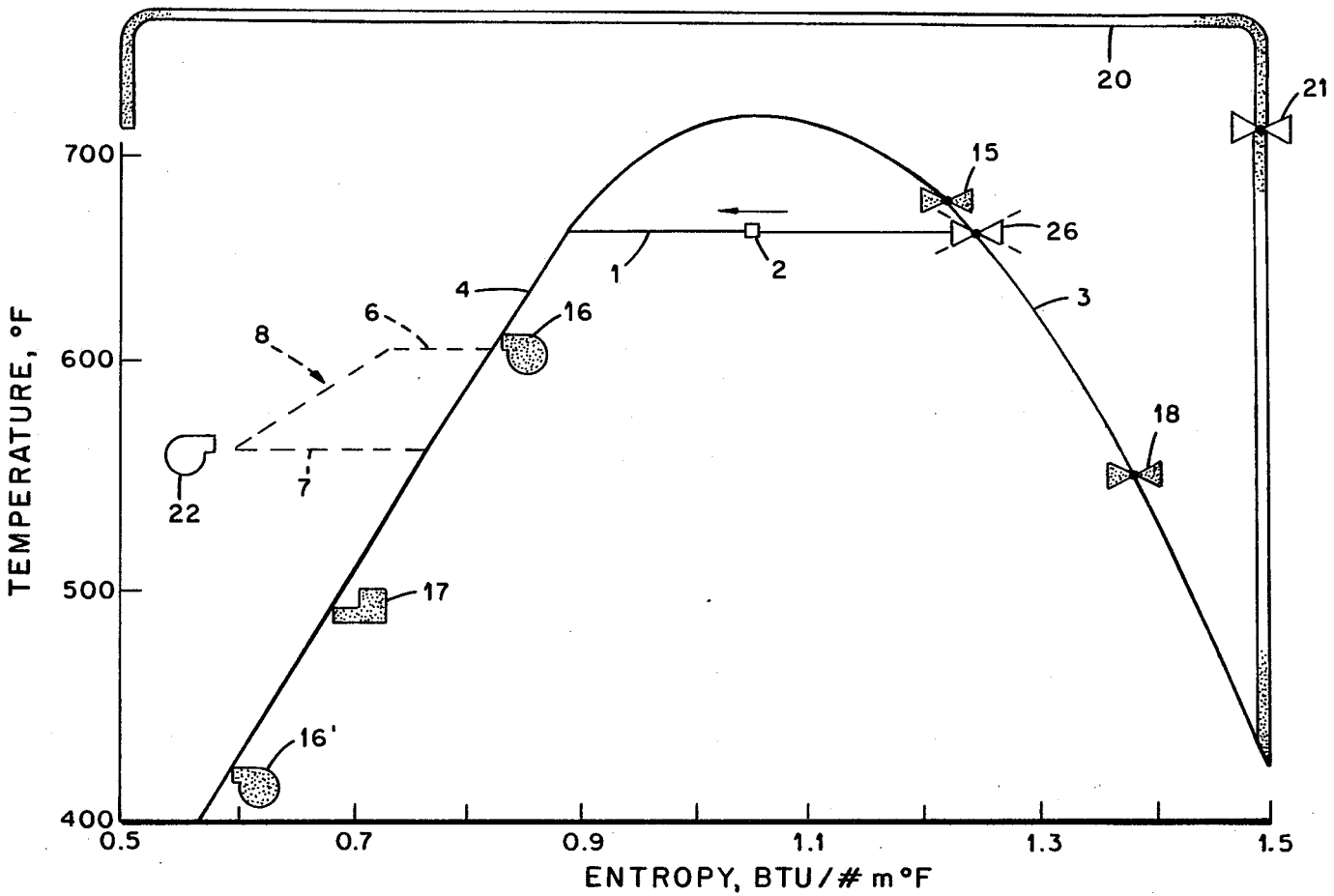

FIG. 16 presents the condition at the initial opening of the electromagnetic relief valve 26. The pressurizer water level is rising as indicated by symbol 2 moving toward the saturated water line 4 because of the partial loss of a heat dump, the steam generator feedwater flow. An estimate of primary coolant water temperatures is shown by the dashed lines.

Figure 17:
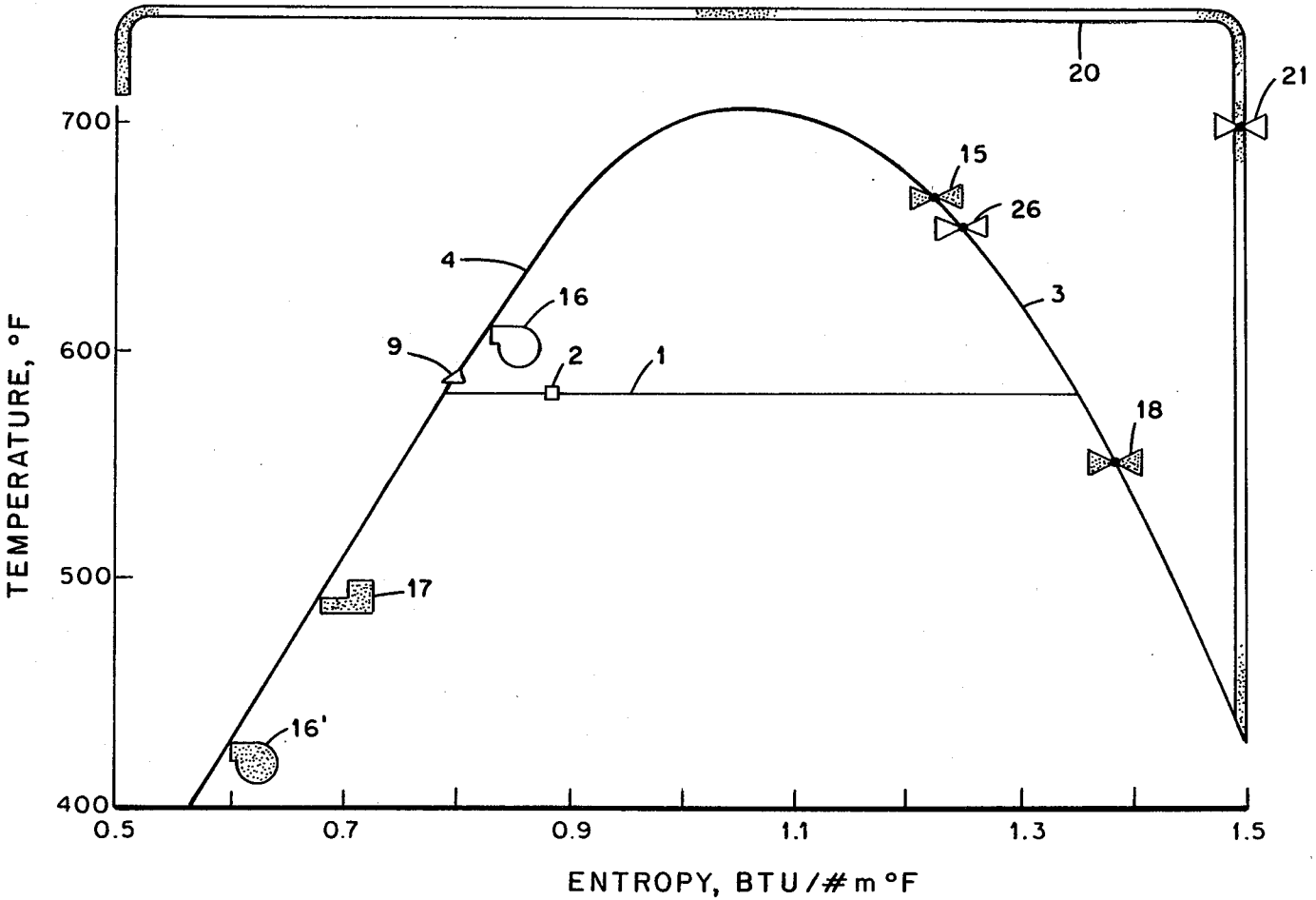

FIG. 17 presents the status of the primary coolant system about six minutes into the event, which is several minutes after reactor trip. The water in the primary coolant system is about saturated and some of the water, such as in the upper head, is probably superheated. The superheated water will flash as pressure falls. The reversal in pressure is probably caused by steam generator dry-out, resulting in a net heat addition to the saturated water which boils (note the increase in hot leg temperature in FIG. 13). Also note only 1 of 3 safety injection pumps 16 are operating.

Figure 18:
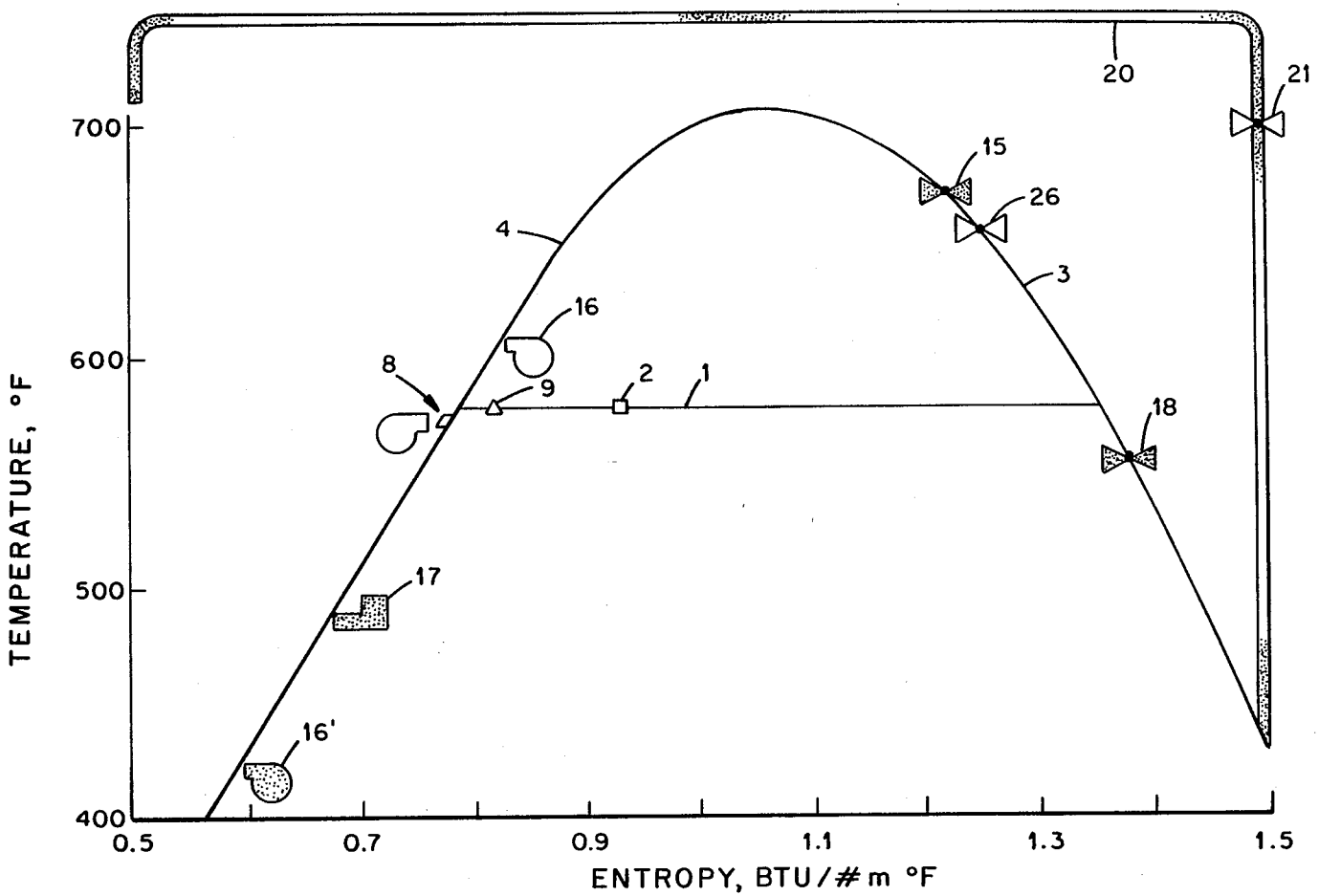

FIG. 18 presents the status of the primary coolant system at about 14 minutes into the event. Data from a reactor water level sensor is needed to establish the water level in the reactor pressure vessel.

Figure 19:
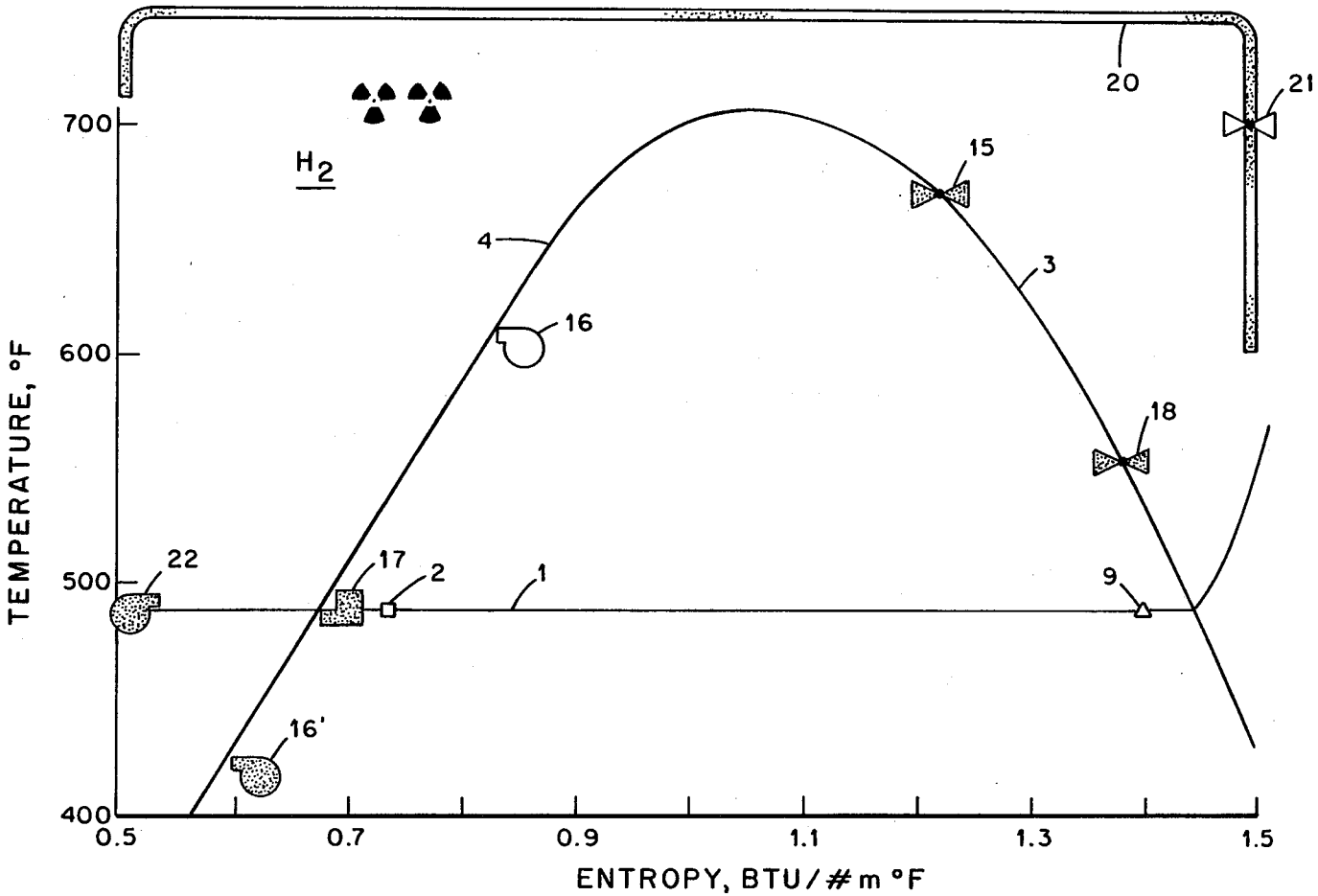

FIG. 19 presents the status of the primary coolant system at injection of the ECCS water which occurs at 600 psign. Subcooled water is converted into superheated steam in the reactor. There has been a significant drop in the primary system pressure, as indicated by the vertical position of pressure bar 1.1. The pressurizer is full of water, as indicated by the position of symbol 2. Radiation is detected in containment and it is highly likely hydrogen gas also exists in containment.

Figure 20:
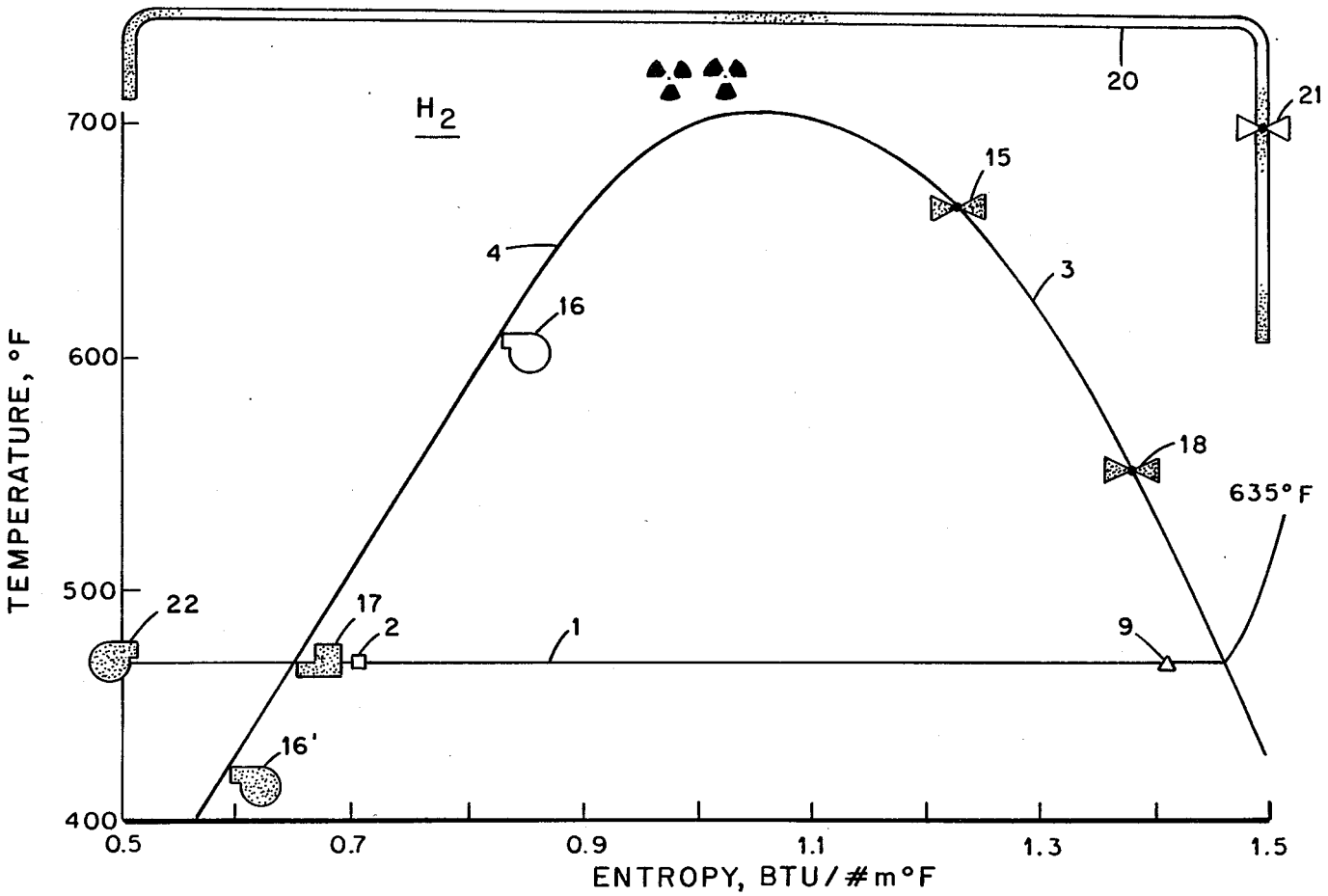

FIG. 20 presents the status of the primary coolant system after the initiation of the ECCS. Because of a loop seal and the expansion of the nitrogen gas, a pressure equilibrium is achieved and the tanks do not empty.

This series of iconic display formats clearly show large changes in display patterns from normal operation to degraded operation.

The two examples of the invention described above clearly illustrate the inventive concept and the actual application thereof. FIGS. 7 through 11 and 15 through 20 show the metamorphosis of two actual abnormal occurrences, as they would have been seen by plant operators had the invention been in use. One skilled in the art, viewing the abnormal occurrence as presented by the invention, would have been able easily to determine what was happening to the thermodynamic cycle. Primarily, this would be accomplished by paying particular attention to the pressurizer bar 1, the water level symbol 2 indicated thereon, and the heat exchanger relationships shown on the water side of the temperature-entropy curve, although other functions are also important. By use of the inventions, impending abnormal occurrences can often be predicted, and efforts made to compensate for them prior to the actual happening. There are virtually no limitations on the amount or type of information that can be displayed, either all at once or selectively. Both real-time data and collected data can be displayed, as well as proposed solutions to a pending problem.

All of this is well within the scope of modern computer technology, and need not be explained herein. Suffice it to say that the invention solves an acknowledged problem in the field, and does so in a manner that, once having been exposed to the inventive tracking, one skilled in the art can readily understand and appreciate.

I claim:

1. A method for monitoring and controlling the operation of a steam-powered electric generating plant by the use of an integrated iconic display comprising the steps of:

a. displaying a temperature-entropy diagram in accordance with the actual operation of the plant;
b. integrating into said temperature-entropy diagram graphic representations of additional factors regarding the operation of said plant including at least pressurizer pressure, pressurizer water level, and heat transfer from the heat source to the steam generating loop;
c. monitoring the relative movements of the said graphic representations with respect to one another and to the temperature-entropy diagram; and
d. controlling the operation of the plant in response to said relative movements within or outside of certain pre-established relationships with one another and with said temperature-entropy diagram.

* * * * *